(12) United States Patent
Sakaguchi

(10) Patent No.: US 10,095,382 B2
(45) Date of Patent: Oct. 9, 2018

(54) DISPLAY APPARATUS

(71) Applicant: KYOCERA Document Solutions Inc., Osaka (JP)

(72) Inventor: Shoichi Sakaguchi, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 382 days.

(21) Appl. No.: 14/778,050

(22) PCT Filed: Jan. 19, 2015

(86) PCT No.: PCT/JP2015/051183
§ 371 (c)(1),
(2) Date: Sep. 17, 2015

(87) PCT Pub. No.: WO2015/129327
PCT Pub. Date: Sep. 3, 2015

(65) Prior Publication Data
US 2016/0274756 A1    Sep. 22, 2016

(30) Foreign Application Priority Data

Feb. 27, 2014 (JP) ............... 2014-037578
Feb. 27, 2014 (JP) ............... 2014-037579
Feb. 27, 2014 (JP) ............... 2014-037580

(51) Int. Cl.
*G06F 3/0482* (2013.01)
*G06F 3/0485* (2013.01)
(Continued)

(52) U.S. Cl.
CPC .......... *G06F 3/0482* (2013.01); *G06F 3/0485* (2013.01); *G06F 3/0488* (2013.01); *G09G 5/34* (2013.01); *G09G 2340/14* (2013.01)

(58) Field of Classification Search
CPC .................................................... G06F 3/0482
See application file for complete search history.

(56) References Cited

U.S. PATENT DOCUMENTS

| | | | | |
|---|---|---|---|---|
| 5,521,841 A * | 5/1996 | Arman | ........... | G06F 3/0485 345/589 |
| 7,907,974 B2 * | 3/2011 | Brinda | ........... | G06F 3/0485 345/156 |

(Continued)

FOREIGN PATENT DOCUMENTS

| | | |
|---|---|---|
| JP | H11-312038 A | 11/1999 |
| JP | 2010-152777 A | 7/2010 |

(Continued)

OTHER PUBLICATIONS

International Search Report dated Mar. 10, 2015 issued in corresponding PCT/JP2015/051183 application (pp. 1-3).

*Primary Examiner* — William L Bashore
*Assistant Examiner* — Nathan K Shrewsbury
(74) *Attorney, Agent, or Firm* — IP Business Solutions, LLC

(57) ABSTRACT

A display apparatus (1) includes a display section (14), a gesture acceptance section (102), and a display control section (101). In providing a second scrolling display of a list, the display control section (101) identifies, among a plurality of items enumerated in the list, an item likely to have been missed by a user in a previous scrolling display and allows the display section to provide the scrolling display of the identified item at a speed different from a speed specified by a scroll gesture accepted by the gesture acceptance section (102) or in a display manner different from that of the other items.

2 Claims, 29 Drawing Sheets

(51) Int. Cl.
*G09G 5/34* (2006.01)
*G06F 3/0488* (2013.01)

(56) References Cited

U.S. PATENT DOCUMENTS

| | | | | |
|---|---|---|---|---|
| 8,245,256 | B2* | 8/2012 | Murthy | H04N 21/4312 |
| | | | | 715/785 |
| 8,359,545 | B2* | 1/2013 | Pixley | G06F 3/03543 |
| | | | | 345/157 |
| 9,035,967 | B2* | 5/2015 | Jakab | G09G 5/34 |
| | | | | 345/619 |
| 9,081,496 | B2* | 7/2015 | Cho | G06F 3/0485 |
| 9,395,905 | B2* | 7/2016 | Wherry | G06F 3/0485 |
| 2006/0084478 | A1* | 4/2006 | Erlichmen | H04M 1/274583 |
| | | | | 455/566 |
| 2007/0146337 | A1* | 6/2007 | Ording | G06F 3/0485 |
| | | | | 345/173 |
| 2009/0028445 | A1* | 1/2009 | Wu | G06F 17/30253 |
| | | | | 382/225 |
| 2010/0058240 | A1* | 3/2010 | Bull | G06F 3/0482 |
| | | | | 715/830 |
| 2011/0252362 | A1* | 10/2011 | Cho | G06F 3/0485 |
| | | | | 715/784 |
| 2012/0005628 | A1* | 1/2012 | Isozu | G06F 3/04842 |
| | | | | 715/838 |
| 2012/0182324 | A1 | 7/2012 | Yano | |
| 2012/0274665 | A1 | 11/2012 | Shimizu et al. | |
| 2013/0139100 | A1* | 5/2013 | Horiike | G06F 3/0485 |
| | | | | 715/784 |
| 2013/0211842 | A1* | 8/2013 | Edgar | G06F 3/167 |
| | | | | 704/275 |
| 2016/0209939 | A1* | 7/2016 | Zambetti | G06F 3/0362 |

FOREIGN PATENT DOCUMENTS

| | | |
|---|---|---|
| JP | 2012-150558 A | 8/2012 |
| JP | 2012-230571 A | 11/2012 |
| JP | 2013-114338 A | 6/2013 |
| JP | 2013-114559 A | 6/2013 |

* cited by examiner

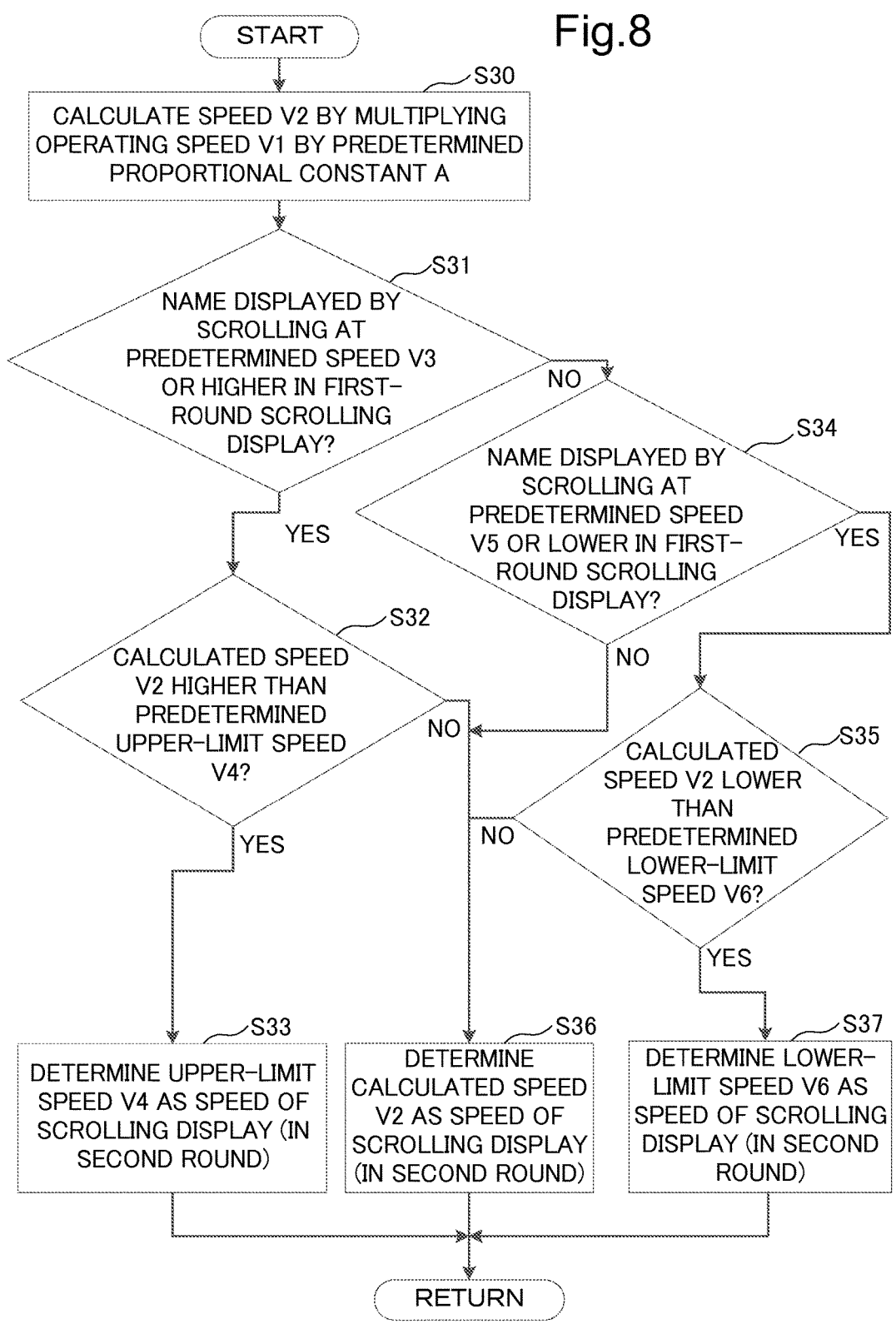

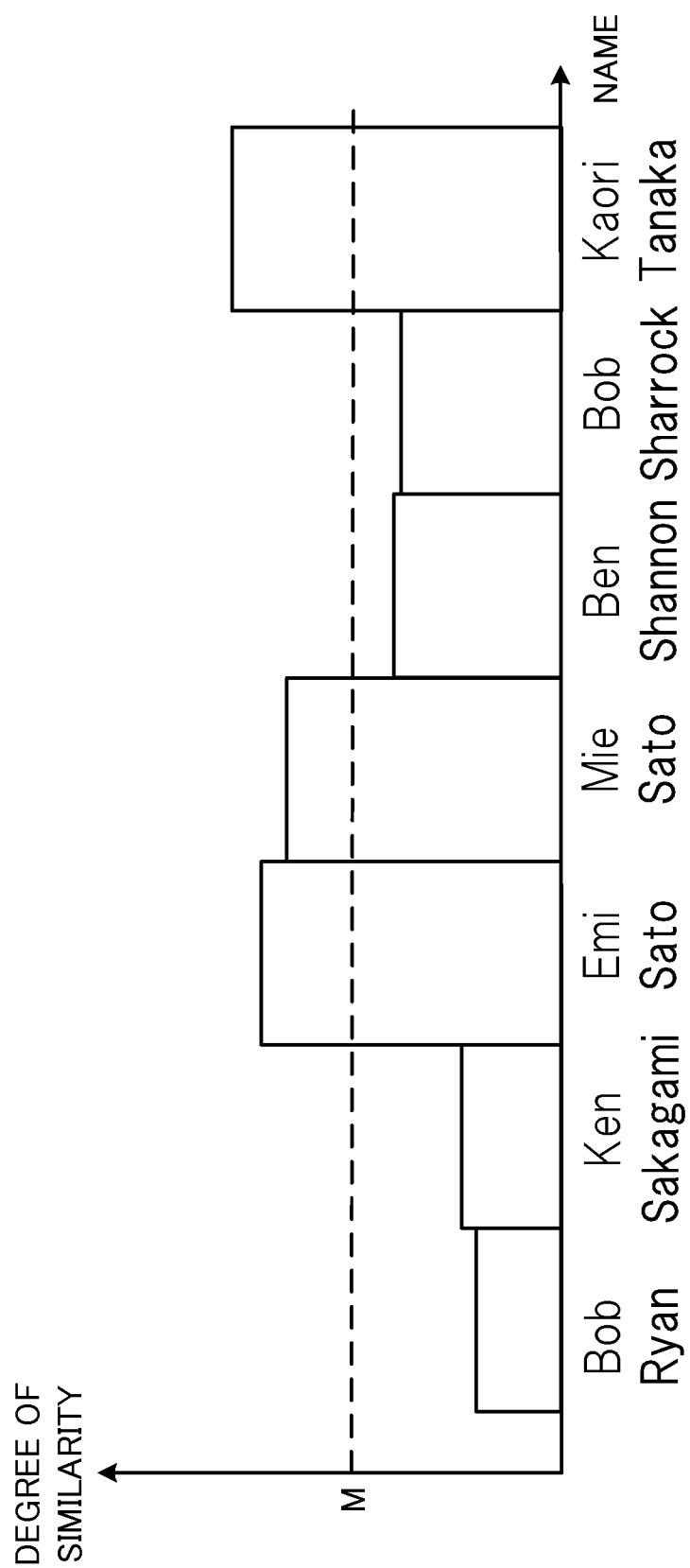

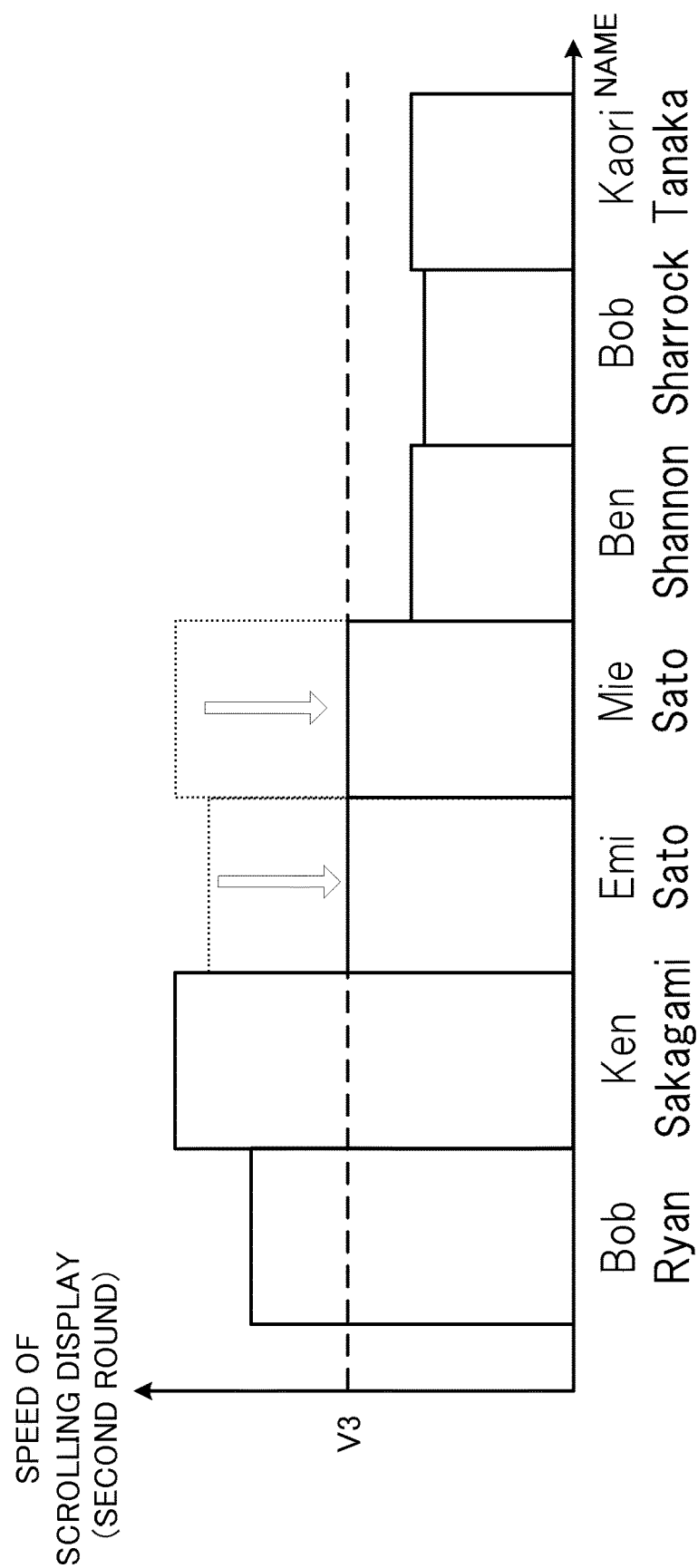

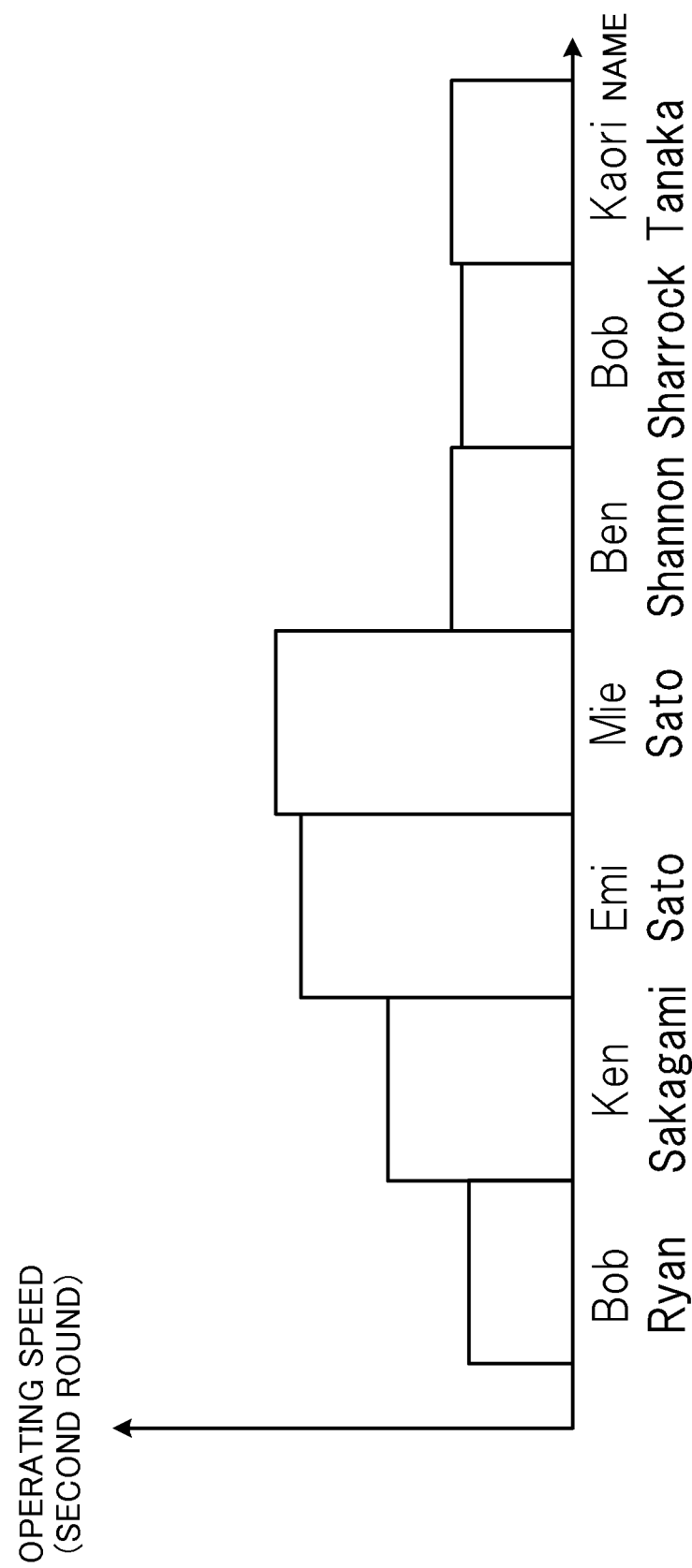

DISPLAY APPARATUS

TECHNICAL FIELD

The present invention relates to display apparatuses, display control programs, and display control methods and particularly relates to a technique for providing a scrolling display of a list formed of a plurality of items enumerated.

BACKGROUND ART

Image forming apparatuses, mobile terminals such as smartphones, personal computers, and like devices and apparatuses may display on their display section a list, such as an address book, formed of a plurality of items enumerated in a predetermined order. For example, in the case of an address book, a plurality of names or so on are displayed as a list in the order of the Japanese syllabary or in alphabetical order. When a scroll gesture, such as a swipe gesture, is entered by an operator, the list displayed on the display section is displayed by scrolling. Thus, the operator can find and select a desired item from among the plurality of items enumerated in the list.

However, for example, when a large number of items are enumerated in the list or when similar items are continued in the list, the operator may have difficulty finding a desired item from among the plurality of items. In respect to this problem, Patent Literature 1 discloses a technique in which during the course of a scrolling display of a list on a display section, the scrolling display is stopped at a previously marked point. Thus, it becomes possible for the operator to easily find the desired item.

CITATION LIST

Patent Literature

Patent Literature 1: JP-A-2013-114338

SUMMARY OF INVENTION

Technical Problem

However, the technique disclosed in the above Patent Literature 1 requires the operator to previously mark a point on the list, which presents the problem of consuming time and effort. In addition, since the scrolling display is inevitably stopped at the marked point, this presents the problem of the operability decreasing in finding an item different from the item corresponding to the marked point.

The present invention has been made in view of the foregoing circumstances and an object thereof is to provide a display apparatus, a display control program, and a display control method that make it easy for an operator to find a desired item without decreasing the operability.

Solution to Problem

A display apparatus according to an aspect of the present invention includes a display section, a gesture acceptance section, and a display control section.

The display section is configured to display a list formed of a plurality of items enumerated in a predetermined order.

The gesture acceptance section is configured to accept a scroll gesture on the list displayed on the display section.

The display control section is configured to allow the display section to provide a scrolling display of the list at a speed specified by the scroll gesture accepted by the gesture acceptance section and, when allowing the display section to display a last item of the plurality of items enumerated in the list, then allow the display section to provide a second scrolling display of the list from a beginning item of the plurality of items following the display of the last item.

Furthermore, in providing the second scrolling display of the list, the display control section identifies, among the plurality of items enumerated in the list, an item likely to have been missed by a user in the previous scrolling display and allows the display section to provide the scrolling display of the identified item at a speed different from the speed specified by the scroll gesture accepted by the gesture acceptance section or in a display manner different from that of the other items.

A display control program according to another aspect of the present invention allows a computer to function as a gesture acceptance section and a display control section.

The gesture acceptance section is configured to accept a scroll gesture and a select gesture on a list displayed on a display section, the list being formed of a plurality of items enumerated in a predetermined order.

The display control section is configured to allow the display section to provide a scrolling display of the list at a speed specified by the scroll gesture accepted by the gesture acceptance section and, when allowing the display section to display a last item of the plurality of items enumerated in the list, then allow the display section to provide a second scrolling display of the list from a beginning item of the plurality of items following the display of the last item.

Furthermore, in providing the second scrolling display of the list, the display control section identifies, among the plurality of items enumerated in the list, an item likely to have been missed in the previous scrolling display by a user and allows the display section to provide the scrolling display of the identified item at a speed different from the speed specified by the scroll gesture accepted by the gesture acceptance section or in a display manner different from that of the other items.

A display control method according to still another aspect of the present invention includes a gesture acceptance step and a display control step.

In the gesture acceptance step, a scroll gesture and a select gesture on a list displayed on a display section and formed of a plurality of items enumerated in a predetermined order are accepted.

In the display control step, a scrolling display of the list is provided at a speed specified by the scroll gesture accepted in the gesture acceptance step and, when the display section is allowed to display a last item of the plurality of items enumerated in the list, a second scrolling display of the list is provided from a beginning item of the plurality of items following the display of the last item.

Furthermore, in providing the second scrolling display of the list in the display control step, among the plurality of items enumerated in the list, an item likely to have been missed by a user in the previous scrolling display is identified and the display section is allowed to provide the scrolling display of the identified item at a speed different from the speed specified by the scroll gesture accepted by the gesture acceptance section or in a display manner different from that of the other items.

Advantageous Effects of Invention

The above-described display apparatus, display control program, and display control method according to the aspects of the present invention can make it easy for an operator to find a desired item without decreasing the operability.

BRIEF DESCRIPTION OF DRAWINGS

FIG. 8 is a flowchart showing a flow of processing for determining the speed of scrolling display (in the second round) on a display apparatus according to Embodiment 2 of the present invention.

FIG. 18 is a graph showing examples of the degrees of similarity of names enumerated in an address book in Embodiment 7 of the present invention.

FIG. 19A is a graph showing the operating speeds of a scroll gesture for a scrolling display in a second round for the individual names enumerated in the address book in Embodiment 7 of the present invention and FIG. 19B is a graph showing the speeds of scrolling display determined based on the operating speeds shown in FIG. 19A.

FIG. 22A is a graph showing the operating speeds of a scroll gesture for a scrolling display in a second round for the individual names enumerated in the address book in Embodiment 8 of the present invention and FIG. 22B is a graph showing the speeds of scrolling display determined based on the operating speeds shown in FIG. 22A.

DESCRIPTION OF EMBODIMENTS

Hereinafter, a description will be given of a display apparatus, a display control program, and a display control method, all according to one embodiment of the present invention, with reference to the drawings.

Embodiment 1

Figure 1:
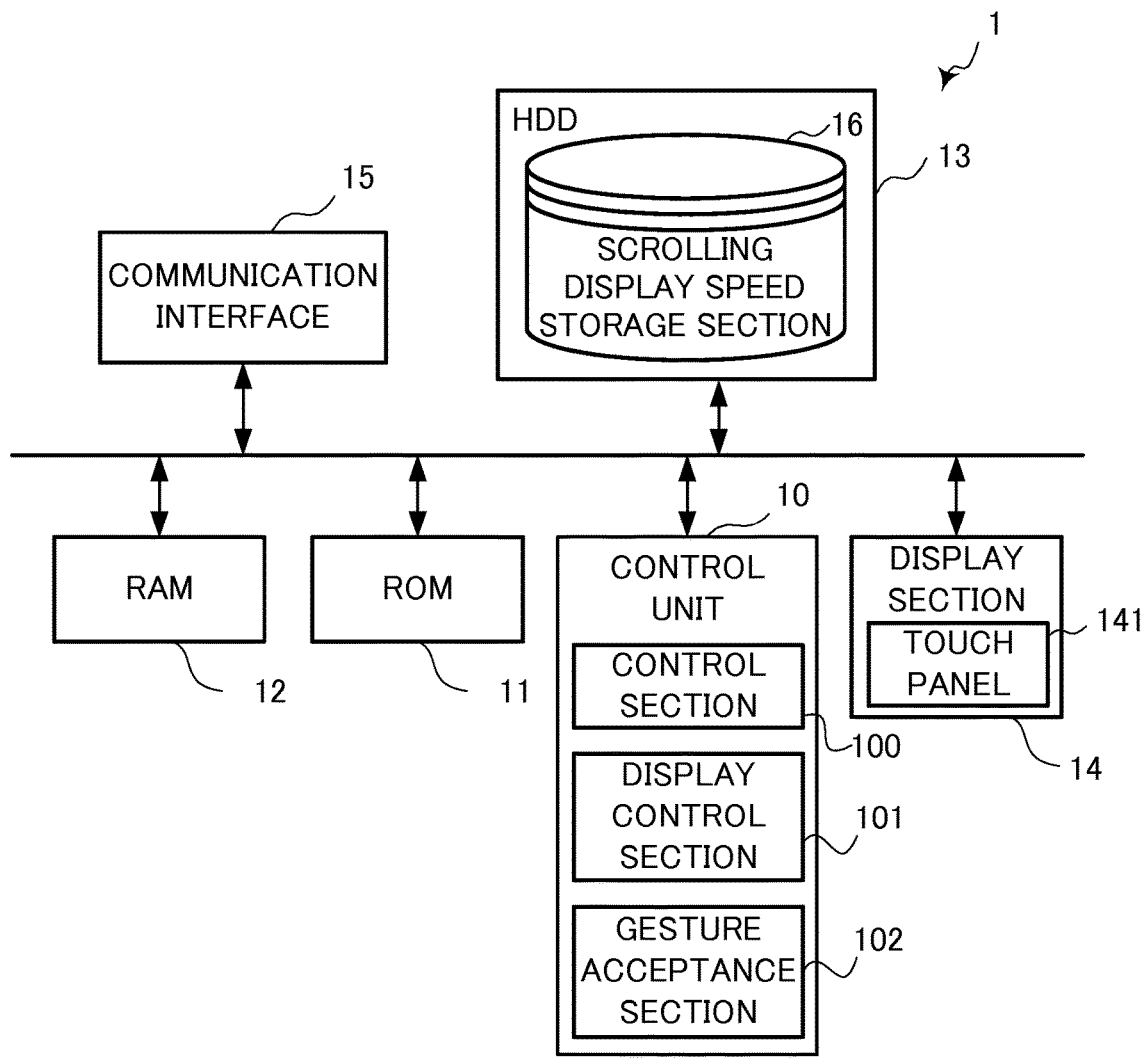
FIG. 1 is a block diagram showing an outline of the internal configuration of a display apparatus according to Embodiment 1 of the present invention.

FIG. 1 is a block diagram showing an outline of the internal configuration of a display apparatus according to Embodiment 1 of the present invention.

A display apparatus 1 according to Embodiment 1 of the present invention is, for example, a mobile device such as a smartphone, and includes a control unit 10, a ROM 11, a RAM 12, an HDD 13, a display section 14, and a communication interface 15. These unit and sections can transfer data or signals to and from one another via a CPU bus.

The control unit 10 is formed of a CPU (central processing unit) or the like and configured to govern the overall operation of the display apparatus 1. The ROM 11 stores an operating program on basic operations of the display apparatus 1. The RAM 12 is used as an operating region of the control unit 10 and for other purposes.

The HDD (hard disk drive) 13 can store, in part of its storage region, various types of data including text data and image data to be printed. The HDD 13 stores a display control program according to Embodiment 1 of the present invention. The control unit 10 operates in accordance with the display control program to function as a control section 100, a display control section 101, and a gesture acceptance section 102. Alternatively, each of the control section 100, the display control section 101, and the gesture acceptance section 102 of the control unit 10 may not be implemented by the operation in accordance with the display control program but may be constituted by a hardware circuit.

Furthermore, the HDD 13 includes a scrolling display speed storage section 16. Although details will be described below, the scrolling display speed storage section 16 stores the speeds of scrolling display of individual items of a list, such as an address book, when each item is displayed by scrolling by the display control section 101.

The communication interface 15 serves as an interface for data communication with personal computers and so on connected over a network.

The display section 14 is formed of an LCD (liquid crystal display), an OLED (organic light-emitting diode) or the like and configured to display contents of various data and images showing operation guidance and the like for the operator operating the display apparatus 1. In this embodiment, a description will be given particularly of contents relating to a scrolling display when a list, such as an address book, formed of a plurality of items enumerated in a predetermined order is displayed on the display section 14.

The display section 14 is provided with a touch panel 141. The touch panel 141 is provided as a display screen of the display section 14 and configured to detect an operator's touch of the display screen together with a touch point (coordinate point). When detecting the operator's touch, the touch panel 141 outputs a detection signal indicating the touch point to the gesture acceptance section 102 and so on. The touch panel 141 encompasses a touch panel operable to detect an operator's finger or the like when the operator's finger or the like, even if not touching the display screen, comes within a certain small distance of the display screen. Therefore, the term "touch" used in this embodiment includes a state where a finger or the like coming within the certain small distance of the display screen is detected, without an actual touch of the display screen, by the function of the touch panel 141, with the consideration of this state as a substantial touch.

The control unit 10, as described previously, includes the control section 100, the display control section 101, and the gesture acceptance section 102.

The control section 100 governs the overall operation control of the display apparatus 1. For example, when a predetermined item of the below-described address book is selected by an operator, the control section 100 performs data communication with a mail server using the communication interface 15 in order to send a mail to a mail address corresponding to the item.

The gesture acceptance section 102 identifies a user's gesture entered by an operator, based on a detection signal output from the touch panel 141. Then, the gesture acceptance section 102 accepts the identified user's gesture and outputs a control signal corresponding to the user's gesture to the control section 100, the display control section 101, and so on.

In this relation, user's gestures include a scroll gesture (referred to also as a swipe gesture), a tap gesture, and a pinch gesture. For example, when the operator slides his/her finger on the display screen of the display section 14 while keeping it in touch with the display screen, the touch panel 14 outputs to the gesture acceptance section 102 detection signals indicating a series of points of movement from an initial point at which the touch has been first detected to a latest position at which the touch is last detected. The gesture acceptance section 102 identifies, based on the detection signals output from the touch panel 141, a user's gesture entered by the operator as a scroll gesture. Then, the gesture acceptance section 102 outputs a control signal corresponding to the scroll gesture to the control section 100, the display control section 101, and so on.

The display control section 101 has the function of controlling the display operation of the display section 14 based on a user's gesture accepted by the gesture acceptance section 102. For example, when the gesture acceptance section 102 accepts a scroll gesture, the display control section 101 allows an image displayed on the display section 14 to be displayed by scrolling according to the scroll gesture. In doing so, the display control section 101 allows the image displayed on the display section 14 to be displayed by scrolling at a speed (a speed of scrolling display) specified by the operating speed of the scroll gesture.

In the case where a list, such as an address book, formed of a plurality of items enumerated in a predetermined order is displayed on the display section 14, an operator can find and select a desired item from among the plurality of items enumerated in the list by entering a scroll gesture to provide a scrolling display of the list.

Figure 2:
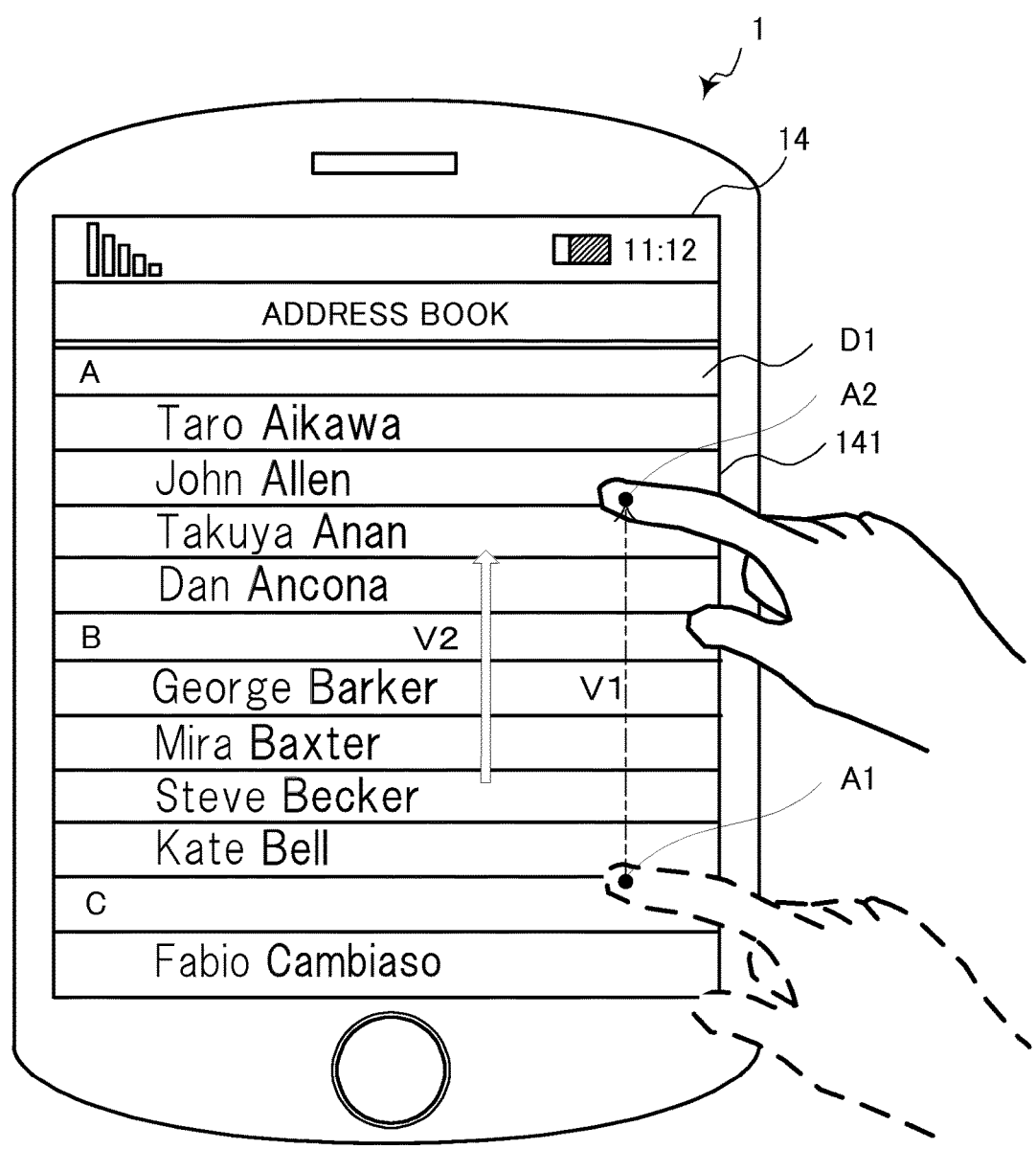
FIG. 2 is a view showing an example of a scrolling screen (a first round thereof) of an address book displayed on a display section of the display apparatus according to Embodiment 1 of the present invention.

FIG. 2 is a view showing an example of a scrolling screen (a first round thereof) of an address book displayed on the display section 14. Generally, in the case of an address book, a plurality of names (items) are displayed as a list in alphabetical order. However, if, for example, a large number of names are registered in the address book, all the names registered in the address book may not be able to be displayed within the display screen of the display section 14. In the example shown in FIG. 2, names beginning with A to C are displayed on the display section 14. When the names presented in the address book are noted not alphabetically but in Japanese characters, they are displayed as a list not in alphabetical order but in the order of the Japanese syllabary.

In this state, the gesture acceptance section 102 identifies a user's gesture entered by an operator based on detection signals output from the touch panel 141. As shown in FIG. 2, when the operator slides his/her index finger from point A1 and stops the sliding movement at a certain point A2, the gesture acceptance section 102 identifies, based on detection signals output from the touch panel 141, the acceptance of a scroll gesture. In this case, a control signal corresponding to the scroll gesture is output from the gesture acceptance section 102 to the display control section 101 and the display control section 101 allows the address book displayed on the display section 14 to be displayed by scrolling according to the control signal.

FIG. 2 shows an example where a scroll gesture is performed at an operating speed V1 by the operator. In this case, the display control section 101 determines a speed V2 (=A×V1) calculated by multiplying the operating speed V1 by a predetermined proportional constant A as the speed at which the address book is displayed by scrolling. The display control section 101 allows the address book displayed on the display section 14 to be displayed by scrolling at the speed V2. As seen from the above, the speed of scrolling display of the address book displayed on the display section 14 is proportional to the operating speed of the scroll gesture.

Figure 3:
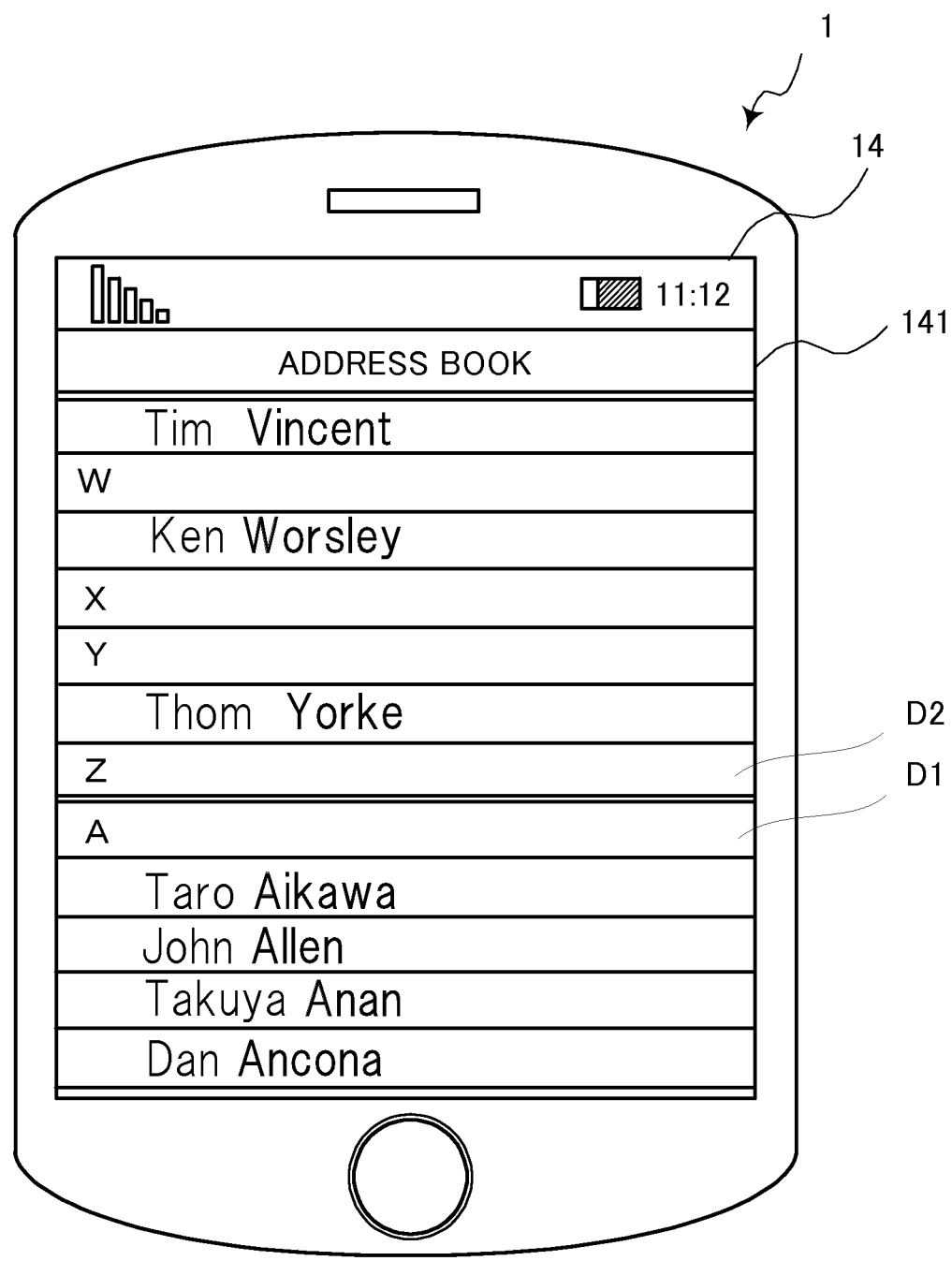
FIG. 3 is a view showing an example of the scrolling screen (a second round thereof) of the address book displayed on the display section of the display apparatus according to Embodiment 1 of the present invention.

FIG. 3 is a view showing an example of the scrolling screen (a second round thereof) of the address book displayed on the display section 14. When as a result of a scrolling display of the address book the end D2 of the address book is displayed, the display control section 101 allows the display section 14 to display the address book again from the beginning D1 thereof following the display of the end D2. In other words, after the address book is displayed by scrolling from the beginning D1 to the end D2, the display control section 101 allows a second-round scrolling display of the address book to be started following the first-round scrolling display of the address book.

The display control section 101 determines the speed of scrolling display of the address book in the second and subsequent rounds based on the speed of scrolling display of the address book in the first round. Specifically, in the first-round scrolling display of the address book, as for each of the items (names) of the address book displayed by scrolling at a predetermined speed or higher, the display control section 101 allows it to be displayed by scrolling at a speed lower than the speed V2 (=A×V1) calculated by multiplying the operating speed V1 by the predetermined proportional constant A. The details of this stage of processing will be described hereinafter.

Figure 4:
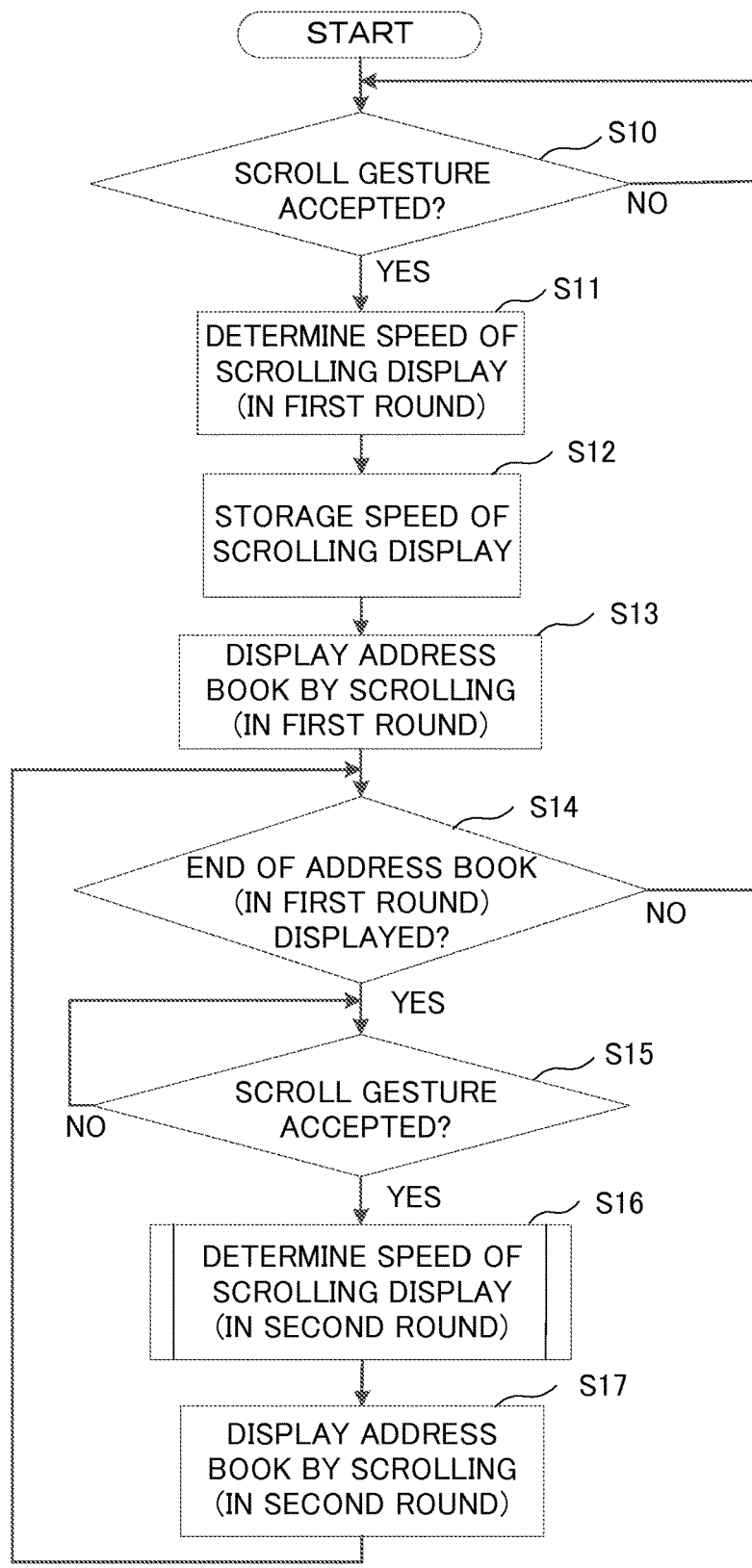
FIG. 4 is a flowchart showing a flow of a scrolling display operation of the display apparatus according to Embodiment 1 of the present invention.

Next, a description will be given of the operation of the display apparatus 1 having the above configuration. The following is a description of the case where an address book is displayed, on the display section 14, as an example of a list formed of a plurality of items enumerated in a predetermined order. FIG. 4 is a flowchart showing a flow of a scrolling display operation of the display apparatus 1.

The gesture acceptance section 102 identifies a user's gesture entered by an operator, based on a detection signal output from the touch panel 141 (step S10). When the acceptance of a scroll gesture is identified from detection signals output from the touch panel 141 (YES in step S10), the display control section 101 determines the speed of scrolling display (in the first round) (step S11). Specifically, the display control section 101 determines a speed V2 calculated by multiplying the operating speed V1 by the predetermined proportional constant A as the speed at which the address book is displayed by scrolling.

After the determination of the speed of scrolling display, the display control section 101 allows the scrolling display speed storage section 16 to store the determined speed (step S12). This series of stages of processing is performed for each of the names enumerated in the address book. In this example, the speed when each of the names enumerated in the address book passes through a predetermined region of the display section 14 is stored, in the scrolling display speed storage section 16, as the speed of scrolling display associated with the name.

After the stage of processing in step S12, the display control section 101 allows the address book displayed on the display section 14 to be displayed by scrolling at the speed determined in the stage of processing in step S11 (step S13).

When as a result of the scrolling display of the address book the end of the address book is displayed (YES in step S14), the display control section 101 allows the display section 14 to display the address book again from the beginning thereof following the display of the end. Thereafter, when a scroll gesture is accepted (YES in step S15), the display control section 101 determines the speed of scrolling display (in the second round) (step S16). The details of the processing in step S16 will be described hereinafter.

After the stage of processing in step S16, the display control section 101 allows the address book displayed on the display section 14 to be displayed by scrolling at the speed determined in the stage of processing in step S16 (step S17).

Figure 5:
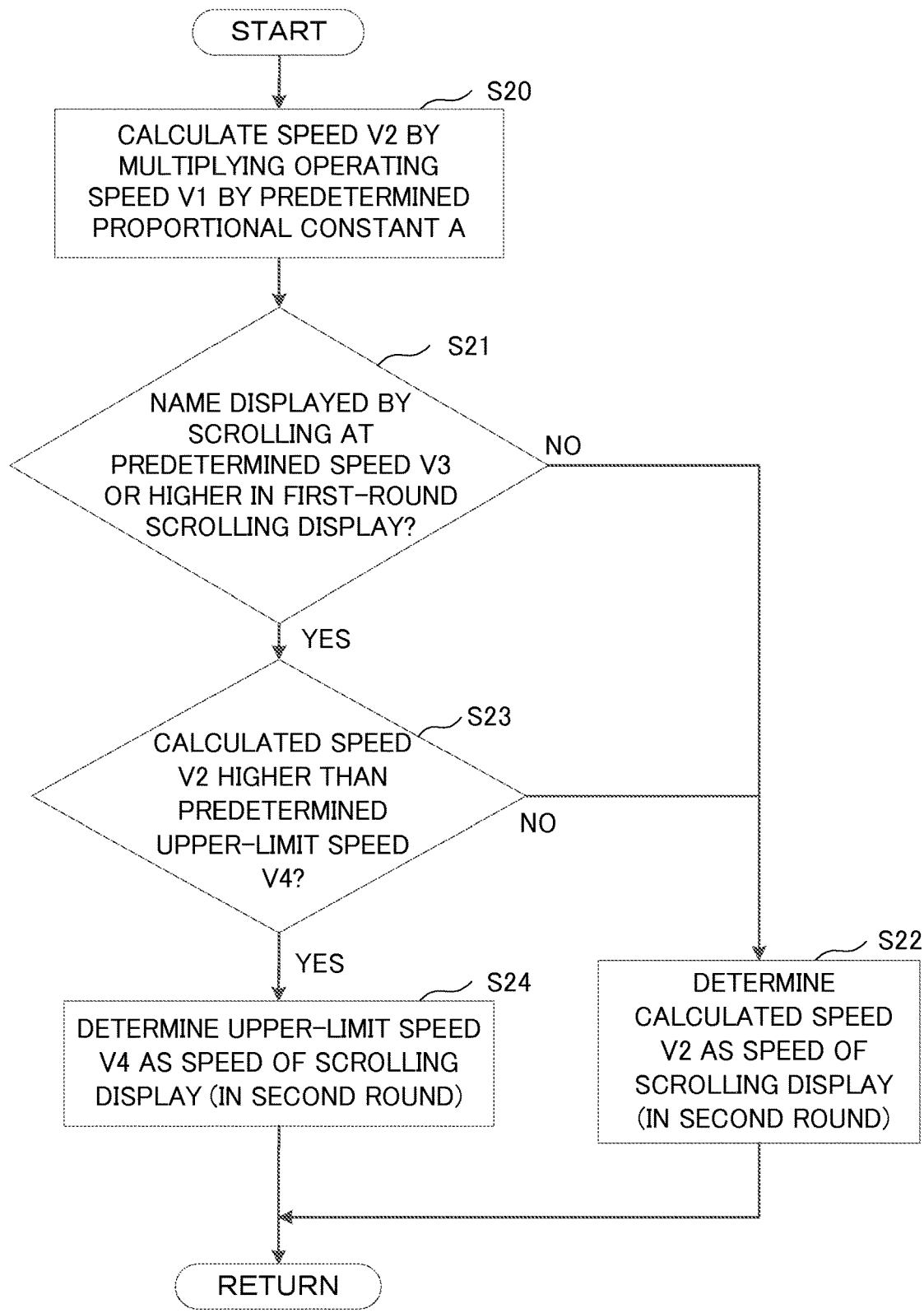
FIG. 5 is a flowchart showing a flow of processing for determining the speed of scrolling display (in the second round) on the display apparatus according to Embodiment 1 of the present invention.

FIG. 5 is a flowchart showing a flow of the processing for determining the speed of scrolling display (in the second round) in step S16.

The display control section 101 first calculates the speed V2 by multiplying the operating speed V1 by the predetermined proportional constant A (step S20). Although for the first-round scrolling display the speed V2 has been determined as the speed of scrolling display, the speed of scrolling display for the second-round scrolling display is determined by additionally performing the following stages of processing from step S21 to step S24.

After step S20, the display control section 101 performs the stage of processing in step S21. In the stage of processing in step S21, the display control section 101 identifies, among the plurality of items enumerated in the list, an item or items likely to have been missed by the user in the previous scrolling display. Specifically, the display control section 101 identifies an item or items likely to have been missed by the user by determining whether or not each name to be displayed by scrolling is a name displayed by scrolling at a predetermined speed V3 or higher in the first-round scrolling display.

If the name to be displayed by scrolling is not any name displayed by scrolling at the predetermined speed V3 or higher in the first-round scrolling display (NO in step S21), the display control section 101 determines the calculated speed V2 as the speed of scrolling display in the second-round scrolling display (step S22).

On the other hand, if the name to be displayed by scrolling is a name displayed by scrolling at the predetermined speed V3 or higher in the first-round scrolling display (YES in step S21), the display control section 101 allows the name to be displayed by scrolling at a speed lower than the calculated speed V2, according to the stages of processing in steps S23 and S24.

In step S23, the display control section 101 determines whether or not the calculated speed V2 is higher than a predetermined upper-limit speed V4. If the calculated speed V2 is higher than the predetermined upper-limit speed V4 (YES in step S23), the display control section 101 determines the predetermined upper-limit speed V4 as the speed of scrolling display in the second-round scrolling display (step S24).

On the other hand, if the calculated speed V2 is lower than the predetermined upper-limit speed V4 (NO in step S23), the display control section 101 determines the calculated speed V2 as the speed of scrolling display in the second-round scrolling display (step S22).

Figure 6A:
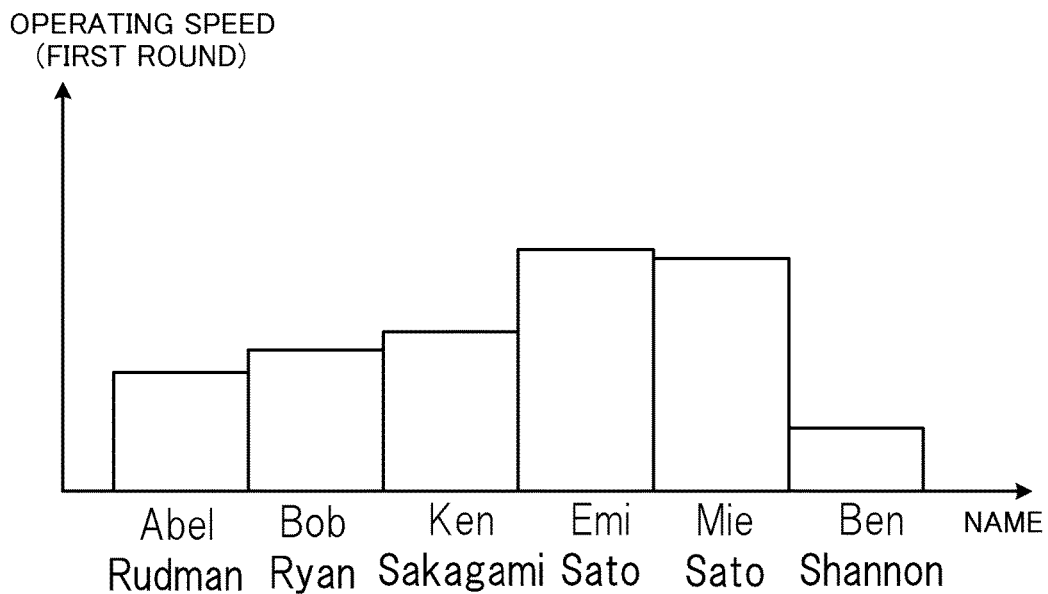
FIG. 6A is a graph showing the operating speeds of a scroll gesture for the scrolling display in the first round for individual names enumerated in the address book in Embodiment 1 of the present invention and FIG. 6B is a graph showing the speeds of scrolling display determined based on the operating speeds shown in FIG. 6A.
Figure 6B:
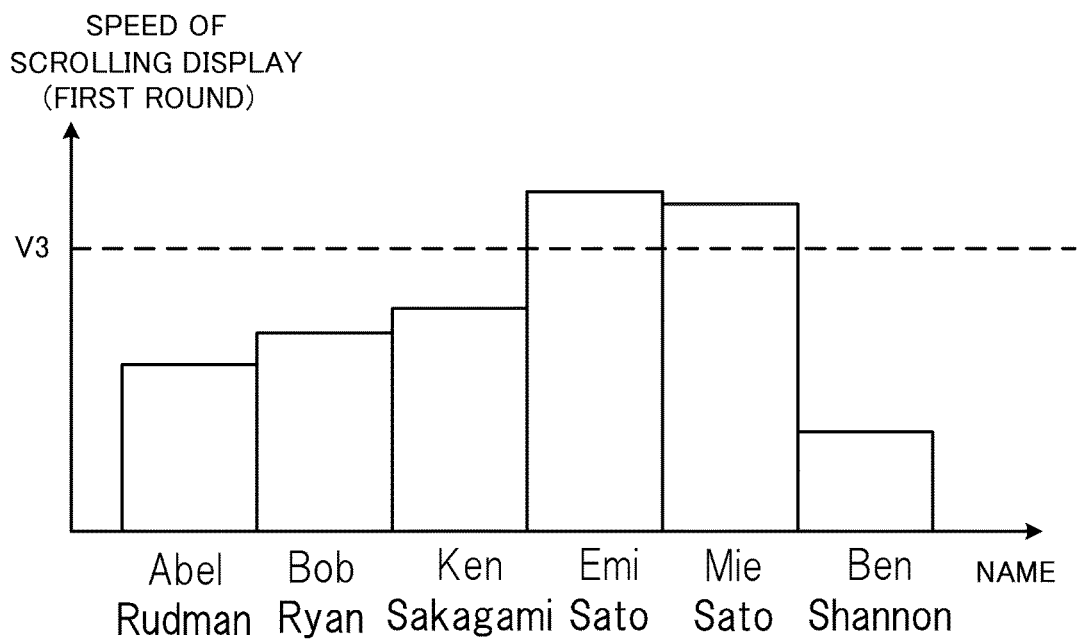
Figure 7A:
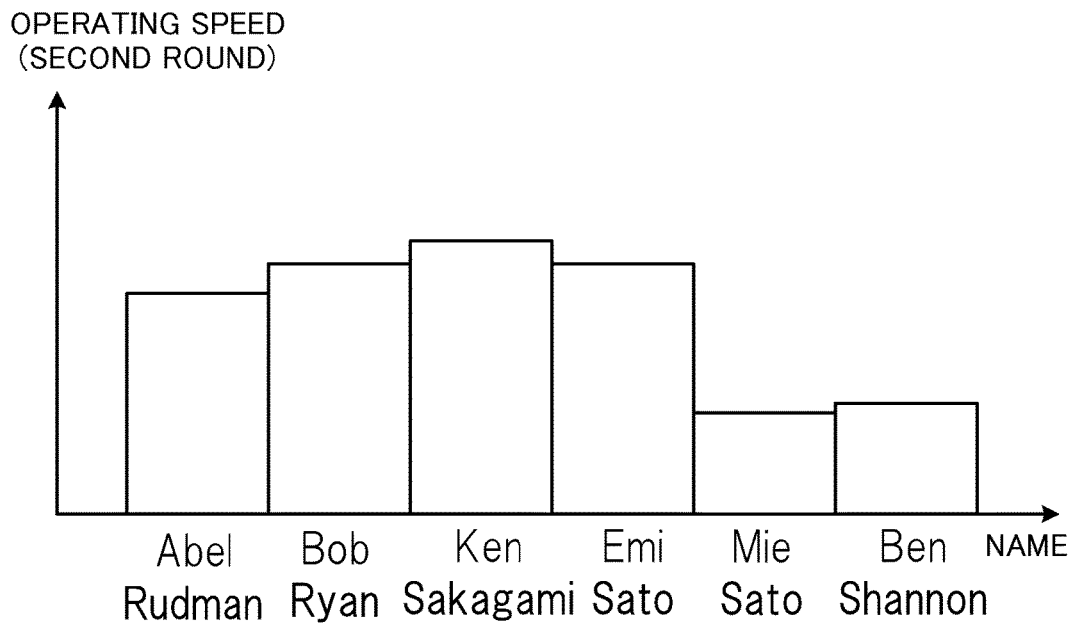
FIG. 7A is a graph showing the operating speeds of a scroll gesture for the scrolling display in the second round for the individual names enumerated in the address book in Embodiment 1 of the present invention and FIG. 7B is a graph showing the speeds of scrolling display determined based on the operating speeds shown in FIG. 7A.

The above-described processing will be described in more detail with reference to FIGS. 6A, 6B, 7A, and 7B. FIG. 6A is a graph showing the operating speeds of a scroll gesture for the scrolling display in the first round for the individual names enumerated in the address book and FIG. 6B is a graph showing the speeds of scrolling display determined based on the operating speeds shown in FIG. 6A. FIG. 7A is a graph showing the operating speeds of a scroll gesture for the scrolling display in the second round for the individual names enumerated in the address book and FIG. 7B is a graph showing the speeds of scrolling display determined based on the operating speeds shown in FIG. 7A.

As shown in FIGS. 6A and 6B, the speed of scrolling display of the address book displayed on the display section 14 is proportional to the operating speed of the scroll gesture. In this case, the two names, "Emi Sato" and "Mie Sato", are displayed by scrolling at speeds higher than the predetermined speed V3.

Figure 7B:
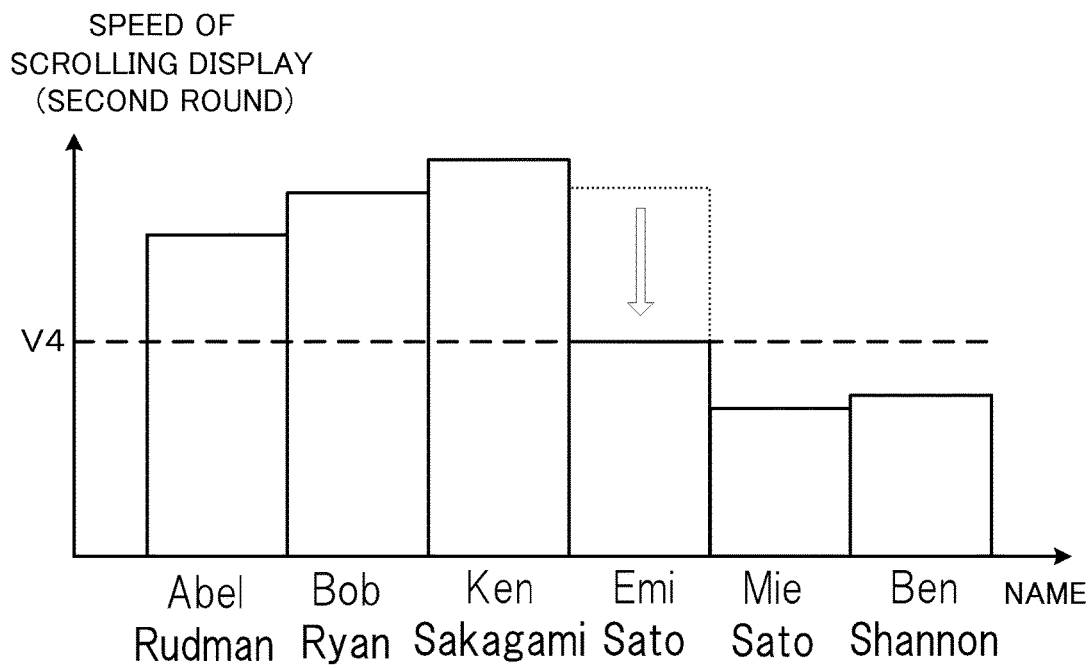

In the case where the address book is displayed by scrolling at such a speed as shown in FIG. 6B, for each of the names other than the two names, "Emi Sato" and "Mie Sato", as shown in FIG. 7B, the speed V2 calculated by multiplying the operating speed shown in FIG. 7A by the predetermined proportional constant A is determined as the speed of scrolling display. On the other hand, for the name "Emi Sato", the speed V2 calculated by multiplying the operating speed shown in FIG. 7A by the predetermined proportional constant A is higher than the predetermined upper-limit speed V4 (see the dotted line in the figure). Therefore, the speed of scrolling display is reduced to the upper-limit speed V4.

For the two names, "Emi Sato" and "Mie Sato", displayed at speeds higher than the predetermined speed V3 in the first-round scrolling display, they have been displayed by scrolling at high speeds and are, therefore, highly likely to have been missed by the operator. For this reason, in the second-round scrolling display, the display control section 101 allows these two names to be displayed by scrolling at speeds lower than their speeds specified by the scroll gesture accepted by the gesture acceptance section 102.

Note that as for the name "Mie Sato", the speed V2 calculated by multiplying the operating speed shown in FIG. 7A by the predetermined proportional constant A is lower than the predetermined upper-limit speed V4. Therefore, without adjusting the speed of scrolling display, the calculated speed V2 is determined as the speed of scrolling display.

When a large number of items are enumerated in the list or when similar items are continued in the list, the operator may have difficulty finding a desired item from among the plurality of items. For example, in the case where the address book contains a plurality of names having the same family name, it is difficult to find a desired name from them. Therefore, even when performing a scrolling display of the address book in a single round from the beginning to the end, the operator may not be able to find the desired name. Hitherto in the case of such a missed name, the operator had to perform a scroll gesture reversely to provide a backward scrolling display of the address book.

In this regard, when the last item of the plurality of items (names) enumerated in the address book is displayed on the display section 14, the display apparatus 1 according to this embodiment allows the display section 14 to provide a second scrolling display of the address book from the beginning. Thus, even when having missed a name, the operator need not perform a scroll gesture reversely, which improves the operability.

Furthermore, in providing the second scrolling display of the address book, the display apparatus 1 according to this embodiment identifies, among the plurality of items enumerated in the list, an item or items likely to have been missed by the user in the previous scrolling display. Specifically, an item or items of the list displayed by scrolling at the predetermined speed or higher in the previous scrolling display are identified as those likely to have been missed by the user in the previous scrolling display. Then, the identified item or items are displayed by scrolling, each at a speed different from the speed specified by the scroll gesture accepted by the gesture acceptance section 102, i.e., at a speed lower than the speed specified by the scroll gesture.

The address book containing a name once missed by the operator is not simply displayed again by scrolling, but a name or names highly likely to have been missed because of a scrolling display at high speed in the first-round scrolling display are displayed by scrolling, each at a speed lower than the speed specified by the scroll gesture. Therefore, the name having been missed by the operator in the first-round scrolling display can be easily found. Hence, the display apparatus 1 according to this embodiment can make it easy for the operator to find a desired item without decreasing the operability.

Embodiment 2

FIG. 8 is a flowchart showing a flow of processing for determining the speed of scrolling display (in the second round) of a display apparatus according to Embodiment 2. Further description of the same stages of processing as those described with reference to the flowchart shown in FIG. 5 will be omitted.

In a stage of processing in step S31 following a stage of processing in step S30, the display control section 101 determines whether or not each name to be displayed by scrolling is a name displayed by scrolling at a predetermined speed V3 or higher in the first-round scrolling display.

If the name to be displayed by scrolling is not any name displayed by scrolling at the predetermined speed V3 or higher in the first-round scrolling display (NO in step S31), the display control section 101 performs a stage of processing in step S34. In the stage of processing in step S34, the display control section 101 identifies, among the plurality of items enumerated in the list, an item or items less likely to have been missed by the user in the previous scrolling display. Specifically, the display control section 101 identifies an item or items less likely to have been missed by the user by determining whether or not each name to be displayed by scrolling is a name displayed by scrolling at a predetermined speed V5 or lower in the first-round scrolling display.

If the name to be displayed by scrolling is not any name displayed by scrolling at the predetermined speed V5 or lower in the first-round scrolling display (NO in step S34), the display control section 101 determines the calculated speed V2 as the speed of scrolling display in the second-round scrolling display (step S36).

If the name to be displayed by scrolling is a name displayed by scrolling at the predetermined speed V5 or lower in the first-round scrolling display (YES in step S34), the display control section 101 determines whether or not the calculated speed V2 is lower than a predetermined lower-limit speed V6 (step S35). If the calculated speed V2 is lower than the predetermined lower-limit speed V6 (YES in step S35), the display control section 101 determines the predetermined lower-limit speed V6 as the speed of scrolling display in the second-round scrolling display (step S37). On the other hand, if the calculated speed V2 is higher than the predetermined lower-limit speed V6 (NO in step S35), the display control section 101 determines the calculated speed V2 as the speed of scrolling display in the second-round scrolling display (step S36).

Figure 9A:
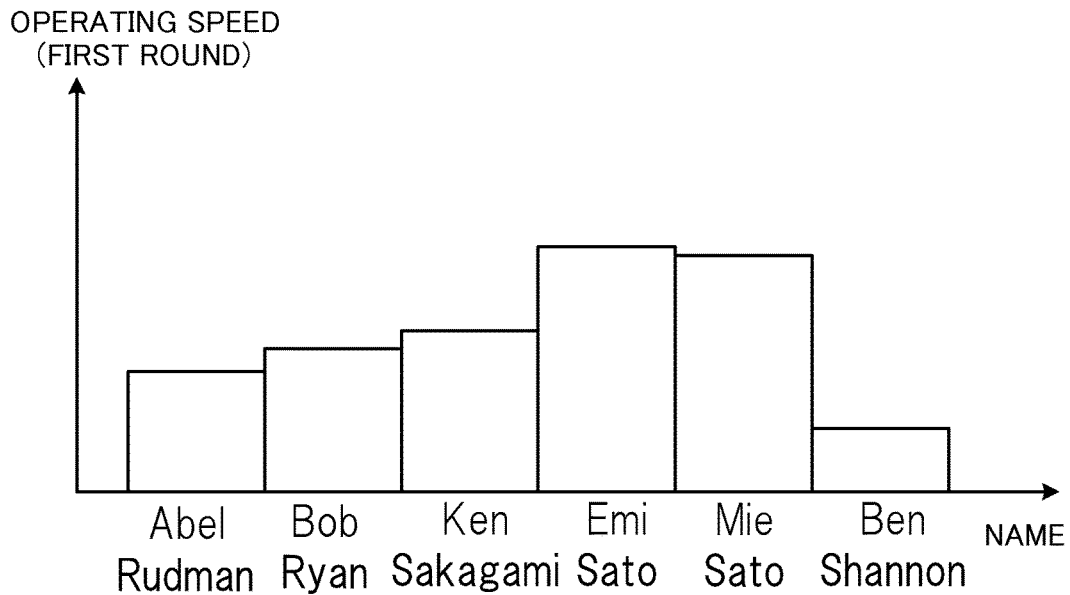
FIG. 9A is a graph showing the operating speeds of a scroll gesture for a scrolling display in a first round for individual names enumerated in an address book in Embodiment 2 of the present invention and FIG. 9B is a graph showing the speeds of scrolling display determined based on the operating speeds shown in FIG. 9A.
Figure 9B:
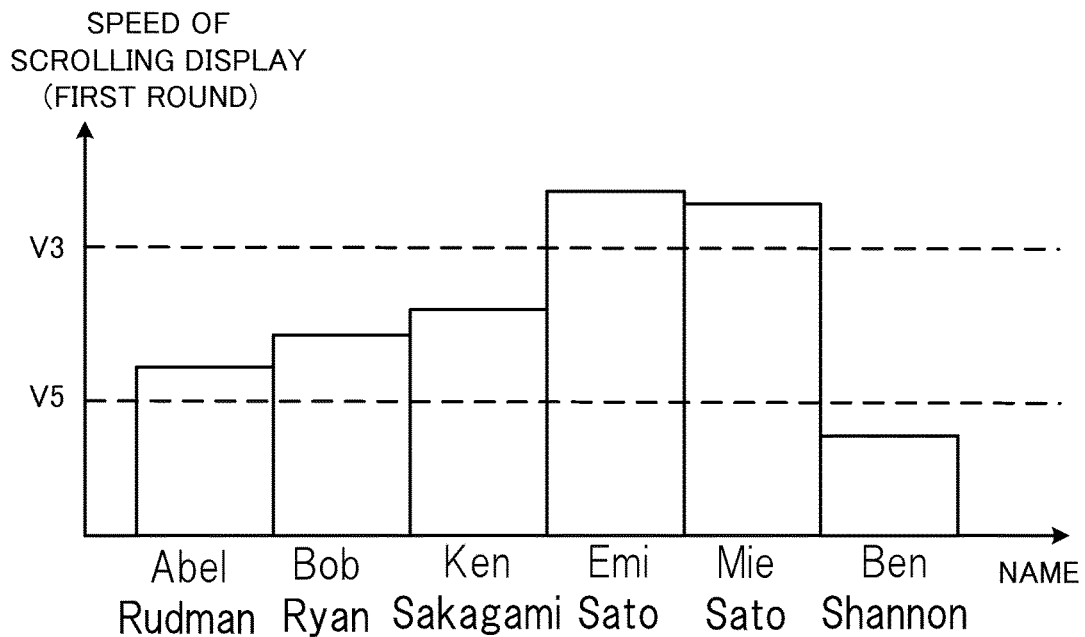
Figure 10A:
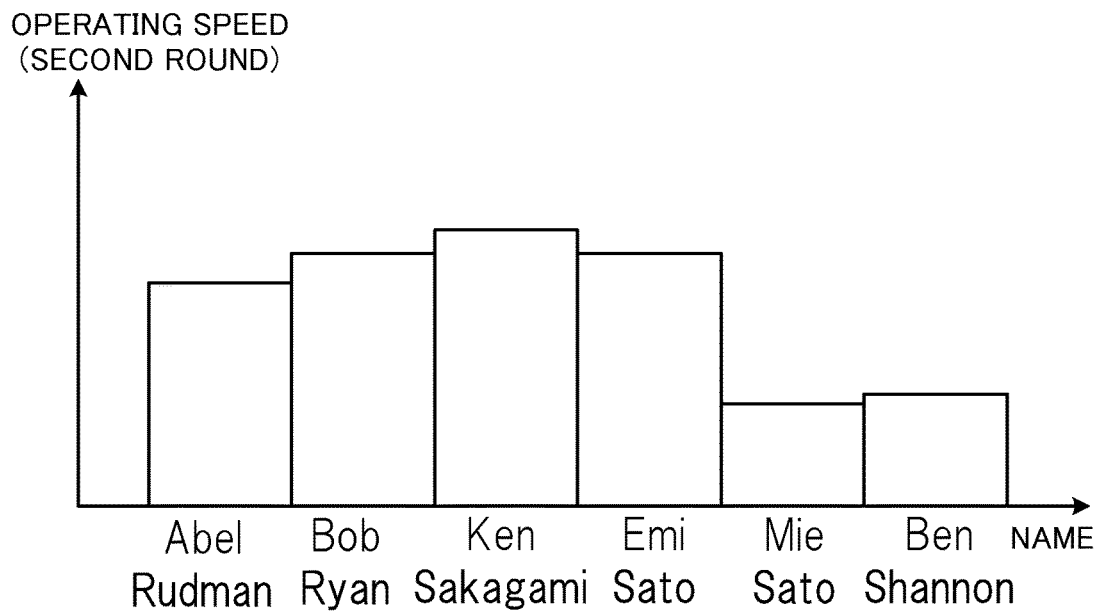
FIG. 10A is a graph showing the operating speeds of a scroll gesture for a scrolling display in a second round for the individual names enumerated in the address book in Embodiment 2 of the present invention and FIG. 10B is a graph showing the speeds of scrolling display determined based on the operating speeds shown in FIG. 10A.

The above-described processing will be described in more detail with reference to FIGS. 9A, 9B, 10A, and 10B. FIG. 9A is a graph showing the operating speeds of a scroll gesture for the scrolling display in the first round for the individual names enumerated in the address book in Embodiment 2 and FIG. 9B is a graph showing the speeds of scrolling display determined based on the operating speeds shown in FIG. 9A. FIG. 10A is a graph showing the operating speeds of a scroll gesture for the scrolling display in the second round for the individual names enumerated in the address book in Embodiment 2 and FIG. 10B is a graph showing the speeds of scrolling display determined based on the operating speeds shown in FIG. 10A.

As shown in FIGS. 9A and 9B, the speed of scrolling display of the address book displayed on the display section 14 is proportional to the operating speed of the scroll gesture. In this case, the name "Ben Shannon" is displayed by scrolling at a speed lower than the predetermined speed V5.

Figure 10B:
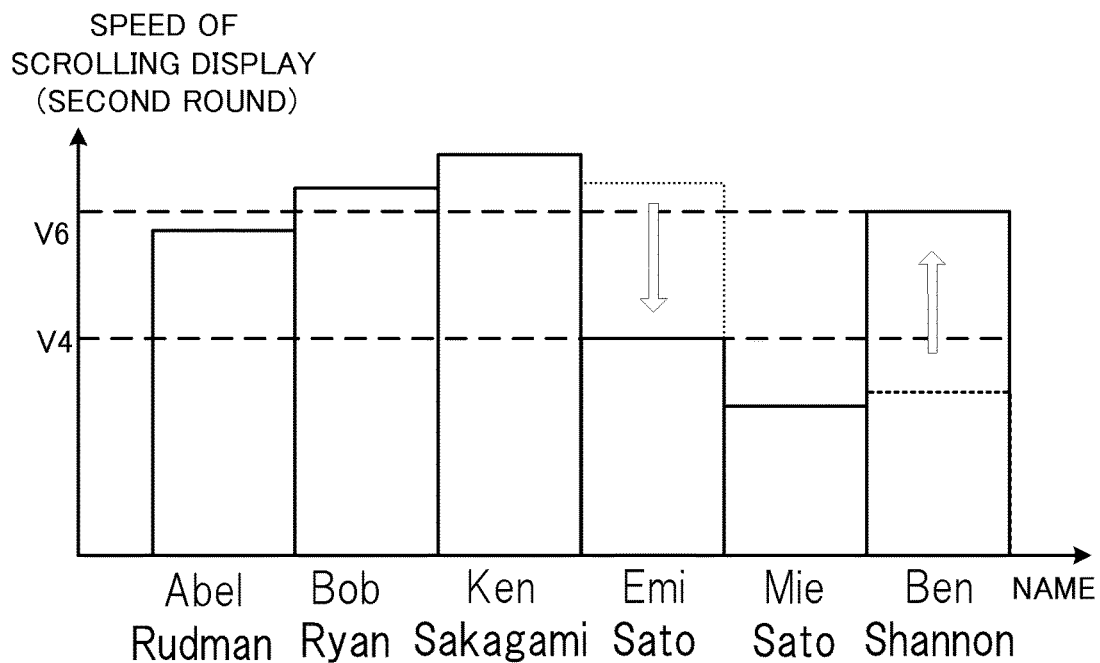

In the case where the address book is displayed by scrolling at such a speed as shown in FIG. 9B, for the name "Ben Shannon", as shown in FIG. 10B, the speed V2 calculated by multiplying the operating speed shown in FIG. 10A by the predetermined proportional constant A is lower than a predetermined lower-limit speed V6 (see the dotted line in the figure). Therefore, the speed of scrolling display is raised to the lower-limit speed V6.

For the name "Ben Shannon" displayed at a speed lower than the predetermined speed V5 in the first-round scrolling display, it is displayed by scrolling at a low speed and is, therefore, less likely to have been missed by the operator. For this reason, in the second-round scrolling display, the display control section 101 allows this name to be displayed by scrolling at a speed higher than the speed specified by the scroll gesture accepted by the gesture acceptance section 102. Since in this manner names less likely to have been missed are displayed by scrolling at high speed, this can make it faster and easier for the operator to find a desired item.

Embodiment 3

Figure 11:
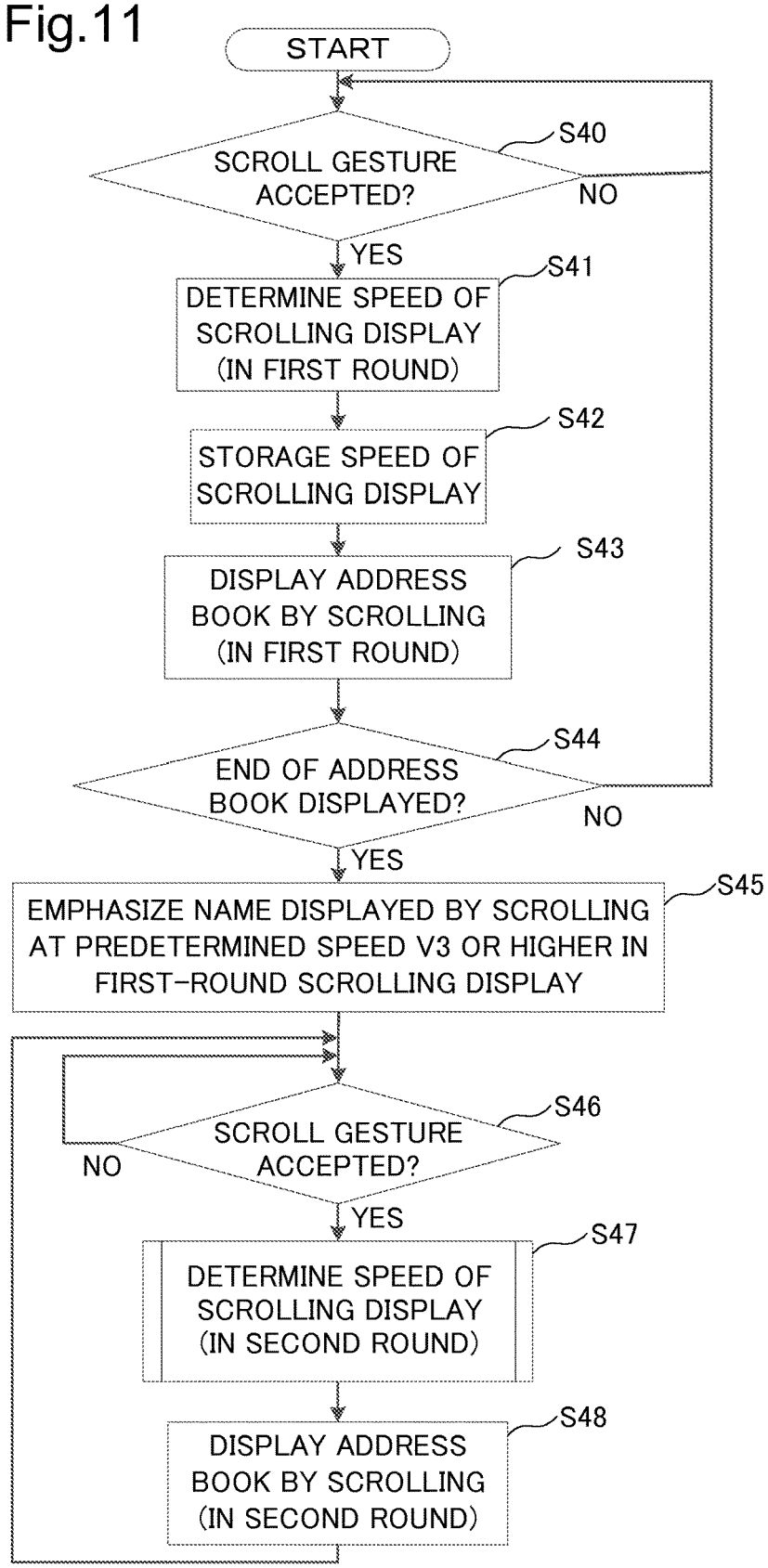
FIG. 11 is a flowchart showing a flow of a scrolling display operation of a display apparatus according to Embodiment 3 of the present invention.

FIG. 11 is a flowchart showing a flow of a scrolling display operation of a display apparatus according to Embodiment 3. Further description of the same stages of processing as those described with reference to the flowchart shown in FIG. 4 will be omitted.

Figure 12:
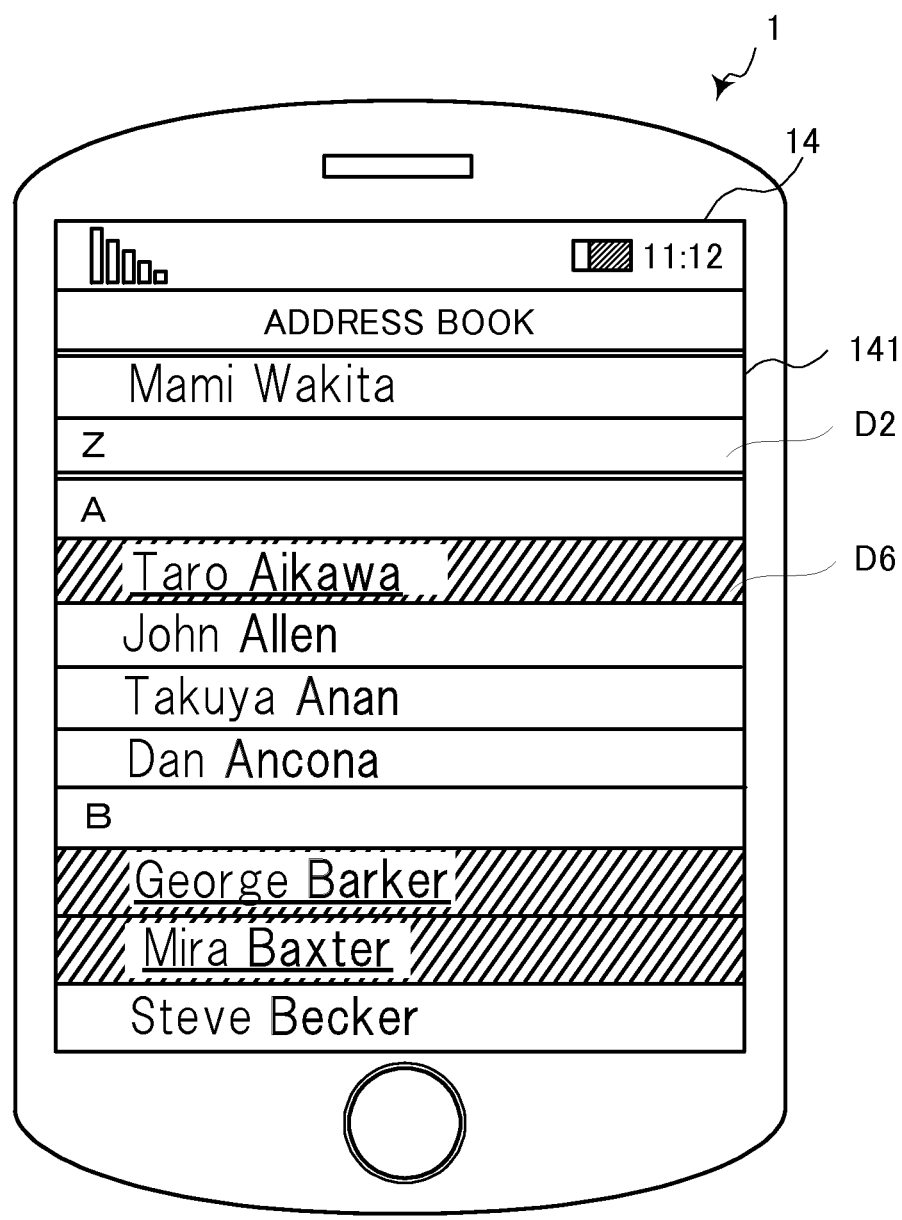
FIG. 12 is a view showing an example of an address book during a second-round scrolling display thereof on the display apparatus according to Embodiment 3 of the present invention.

As shown in FIG. 11, in the display apparatus according to Embodiment 3, when as a result of a scrolling display of the address book the end of the address book is displayed (YES in step S44), the display control section 101 allows the display section 14 to display the address book again from the beginning thereof following the display of the end. In doing so, as shown in FIG. 12, the display control section 101 makes the names displayed by scrolling at the predetermined speed V3 or higher in the first-round scrolling display different in display manner from the other names (step S45). In an example shown in FIG. 12, the address book D6 is displayed on the display section 14 so that the names displayed by scrolling at high speed in the first-round scrolling display are made different in display manner from the other names by underlining them. Alternatively, the targeted names may be emphasized more than the other names, for example, by increasing the character size.

In the display apparatus according to Embodiment 3, the address book containing a name once missed by the operator is not simply displayed again by scrolling, but the display section 14 is allowed to display the address book D6 in which a name or names highly likely to have been missed by the operator because of a scrolling display at high speed are shown differently in display manner from the other names. Therefore, the searchability is increased.

Embodiment 4

Figure 13:
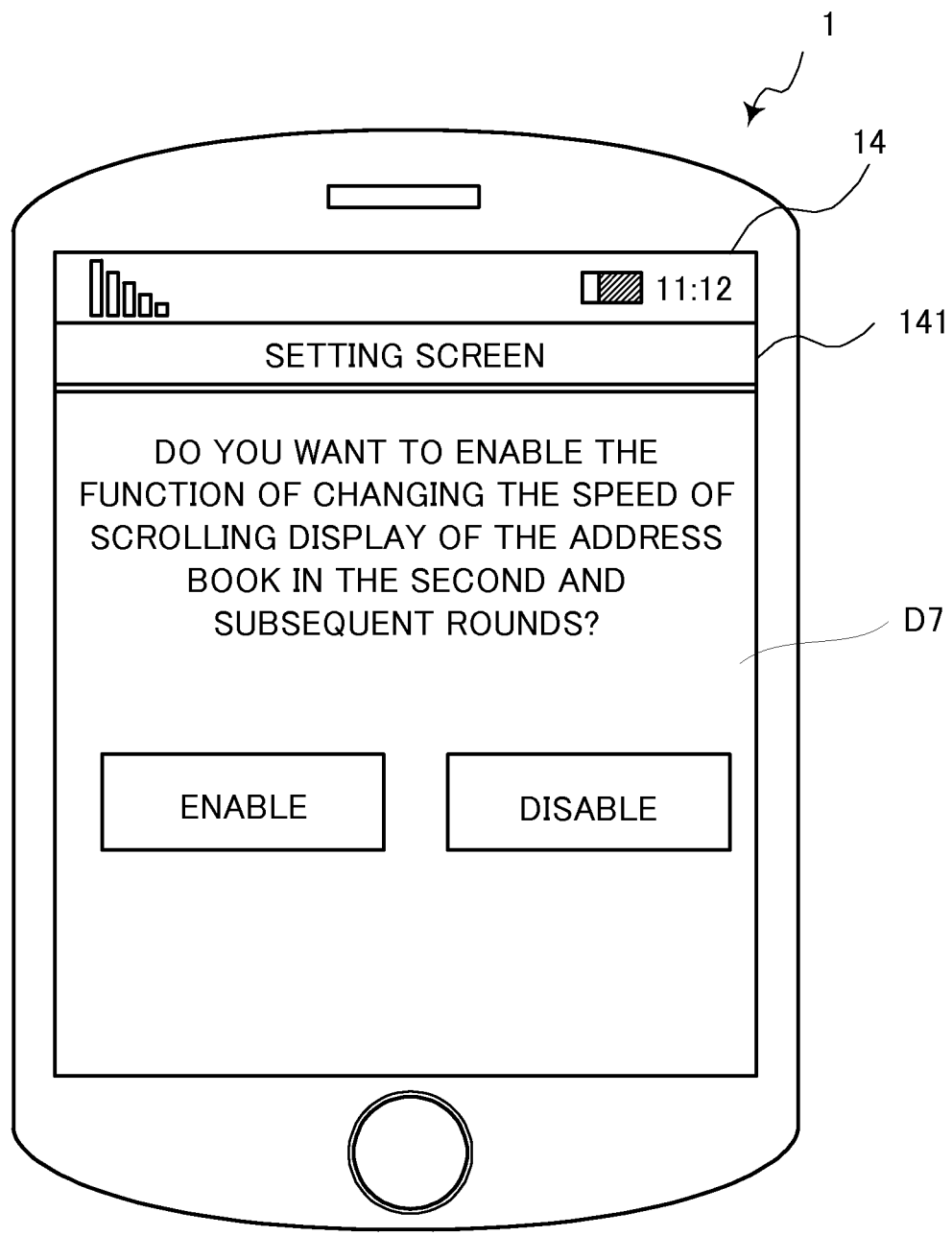
FIG. 13 is a view showing an example of a setting screen on a display apparatus according to Embodiment 4 of the present invention.

It may be possible that the operator chooses whether to enable or disable the function of changing the speed of scrolling display of the address book in the two and subsequent rounds as described in the above embodiments. FIG. 13 is a view showing an example of a setting screen on a display apparatus according to Embodiment 4.

In the display apparatus according to Embodiment 4, the display control section 101 allows the display section 14 to display a setting screen D7 for accepting to enable or disable the function of changing the speed. Furthermore, the display control section 101 accepts the setting of enablement or disablement of a search refinement function entered by the operator using the touch panel 141, an unshown keyboard or so on. When accepting the setting of disablement of the function of changing the speed, the display control section 101 does not change the speed of scrolling display of the address book in the second and subsequent rounds.

Embodiment 5

The description in the above embodiments has been given of the case where in providing a second scrolling display of the address book, the item of the address book displayed by scrolling at the predetermined speed or higher in the previous scrolling display is controlled to reduce the speed of scrolling display to the predetermined upper-limit speed or lower and thus displayed by scrolling at a speed lower than the speed specified by the scroll gesture accepted by the gesture acceptance section 102. However, the present invention is not necessarily limited to this case. The item may be displayed by scrolling at a speed lower than the speed specified by the scroll gesture accepted by the gesture acceptance section 102 by setting the speed of scrolling display to a speed calculated by multiplying the operating speed V1 by a value smaller than the predetermined proportional constant A.

Embodiment 6

The description in the above embodiments has been given of the case where when the display control section 101 allows the address book to be displayed again by scrolling, the name of the address book displayed by scrolling at the predetermined speed or higher in the previous scrolling display is displayed by scrolling at a speed lower than the speed specified by the scroll gesture accepted by the gesture acceptance section 102. However, the present invention is not necessarily limited to this case. For the name of the address book displayed by scrolling at the predetermined speed or higher in the previous scrolling display, the display control section 101 may allow the name of the address book to be displayed by scrolling at a constant speed regardless of the speed specified by the scroll gesture accepted by the gesture acceptance section 102.

Figure 14A:
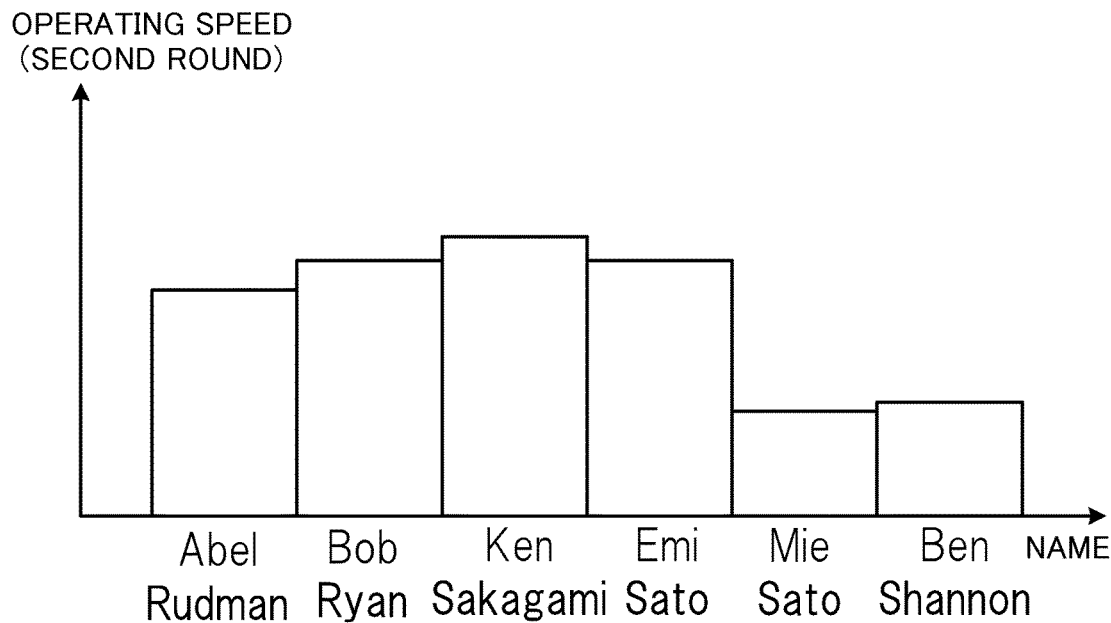
FIG. 14A is a graph showing the operating speeds of a scroll gesture for a scrolling display in a second round for individual names enumerated in an address book in Embodiment 6 of the present invention and FIG. 14B is a graph showing the speeds of scrolling display in the second round for the individual names enumerated in the address book in Embodiment 6 of the present invention.
Figure 14B:
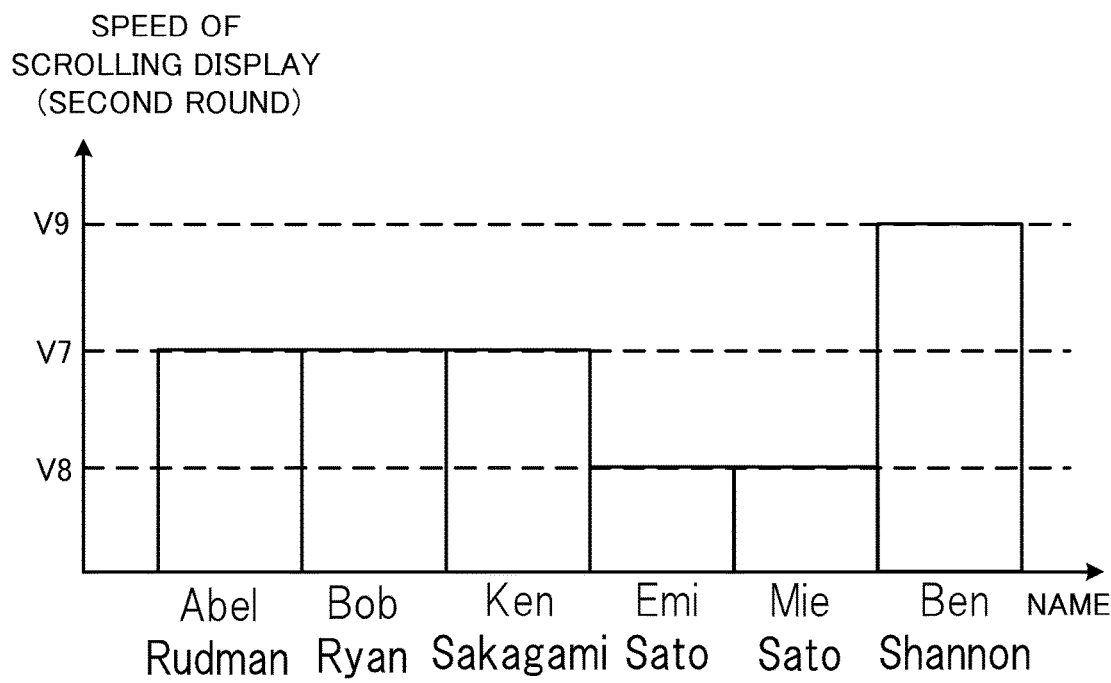

FIG. 14A is a graph showing the operating speeds of a scroll gesture for the scrolling display in the second round for the individual names enumerated in the address book in Embodiment 6 and FIG. 14B is a graph showing the speeds of scrolling display in the second round for the individual names enumerated in the address book in Embodiment 6. Here, the operating speeds of a scroll gesture for the first-round scrolling display are the speeds shown in FIG. 9A and the speeds of scrolling display in the first round are the speeds shown in FIG. 9B.

In the example shown in FIGS. 9A and 9B, the two names, "Emi Sato" and "Mie Sato", are displayed by scrolling at speeds higher than the predetermined speed V3. The name "Ben Shannon" is displayed by scrolling at a speed lower than the predetermined speed V5. The three names, "Abel Rudman", "Bob Ryan", and "Ken Sakagami", are displayed by scrolling at speeds higher than the predetermined speed V5 and lower than the predetermined speed V3. In this case, as shown in FIGS. 14A and 14B, the display control section 101 of the display apparatus according to Embodiment 6 allows the three names, "Abel Rudman", "Bob Ryan", and "Ken Sakagami", to be displayed by scrolling, regardless of their speeds specified by the scroll gesture accepted by the gesture acceptance section 102, at an average speed V7 among the speeds of scrolling display in the first round from that of the beginning item to that of the last item. Furthermore, the display control section 101 allows the two names, "Emi Sato" and "Mie Sato", to be displayed by scrolling, regardless of their speeds specified by the scroll gesture accepted by the gesture acceptance section 102, at a first speed V8 which is a speed a predetermined value lower than the speed V7. Moreover, the display control section 101 allows the name "Ben Shannon" to be displayed by scrolling at a second speed V9 which is a speed a predetermined value higher than the speed V7.

In this manner, the address book containing a name once missed by the operator is not simply displayed again by scrolling, but a name or names ("Emi Sato" and so on in the above example) highly likely to have been missed because of a scrolling display at high speed in the first-round scrolling display are displayed by scrolling, regardless of the speeds specified by the scroll gesture accepted by the gesture acceptance section 102, at a constant speed (first speed). Therefore, the name having been missed by the operator in the first-round scrolling display can be easily found. In addition, the first speed is a speed lower than the average speed among the speeds of scrolling display of the items from the beginning item to the last item displayed by scrolling in the first-round scrolling display. Therefore, the name having been missed by the operator in the first-round scrolling display can be more easily found.

Embodiment 7

Figure 15:
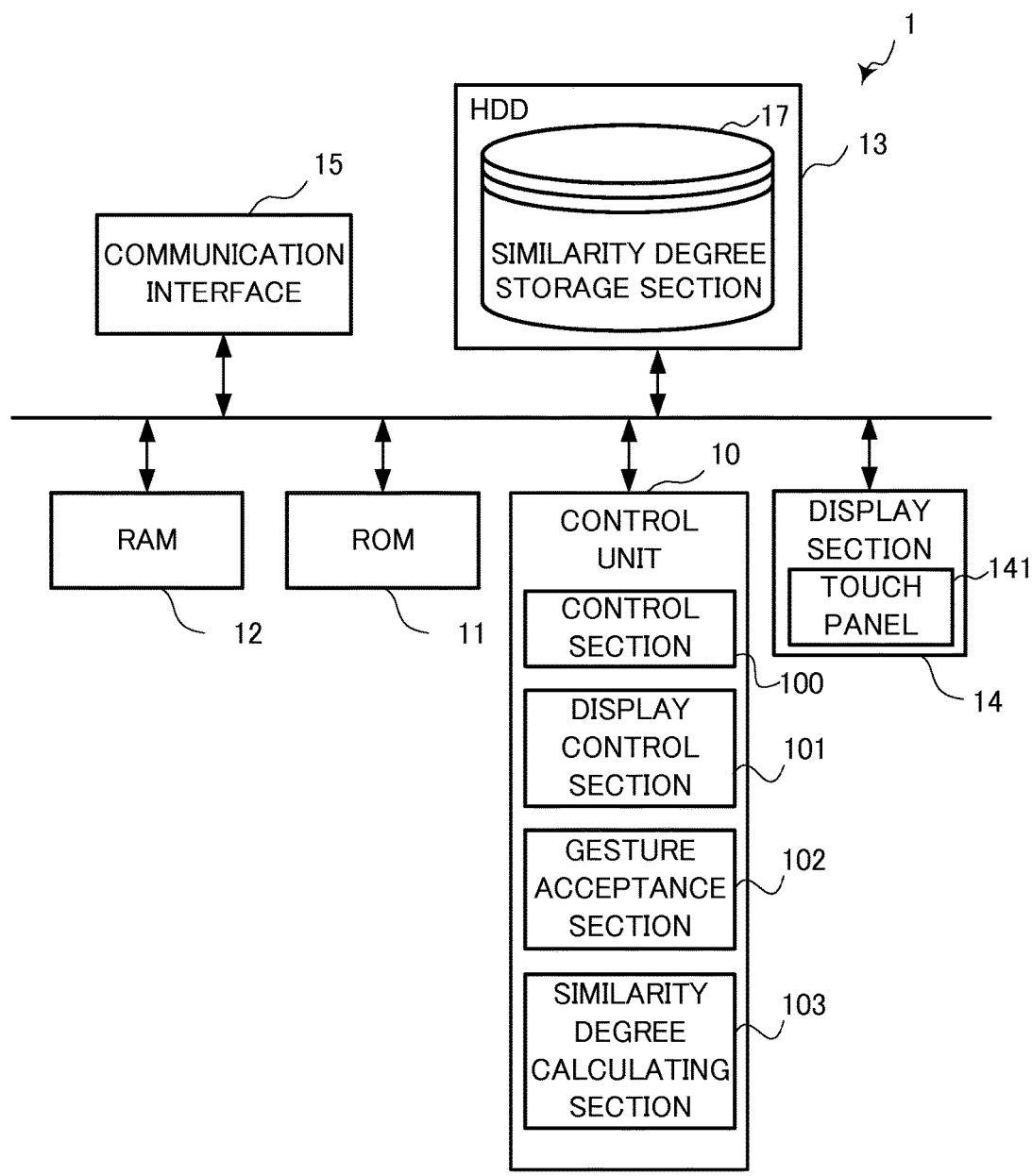
FIG. 15 is a block diagram showing an outline of the internal configuration of a display apparatus according to Embodiment 7 of the present invention.

FIG. 15 is a block diagram showing an outline of the internal configuration of a display apparatus according to Embodiment 7. Further description of the same stages of processing as those described with reference to the flowchart shown in FIG. 1 will be omitted.

The control unit 10 operates in accordance with the display control program stored on the HDD 13 or the like to additionally function as a similarity degree calculating section 103.

The similarity degree calculating section 103 is configured to calculate the degree of similarity of each of a plurality of items enumerated in a list, such as an address book, to the adjacent items in the list. The degree of similarity is calculated based on the similarity in character shape and the similarity in nominal designation. For example, the similarity degree calculating section 103 calculates the degree of similarity, for example, according to the number of identical characters and characters of high similarity in shape (for example, similarity between "n" and "m") between adjacent names. The similarity degree calculating section 103 allows a similarity degree storage section 17 in the HDD 13 to store the calculated degree of similarity.

The display control section 101 determines, based on the degrees of similarity of the items in the list, such as an address book, stored in the similarity degree storage section 17, the speeds of scrolling display of items to be displayed by scrolling during the scrolling displays of the address book in the second and subsequent rounds. Specifically, as for each of the items (names) of the address book whose degrees of similarity stored in the similarity degree storage section 17 are equal to or higher than a predetermined value, the display control section 101 allows it to be displayed by scrolling at a speed lower than the speed V2 (=A×V1) calculated by multiplying the operating speed V1 by the predetermined proportional constant A.

Figure 16:
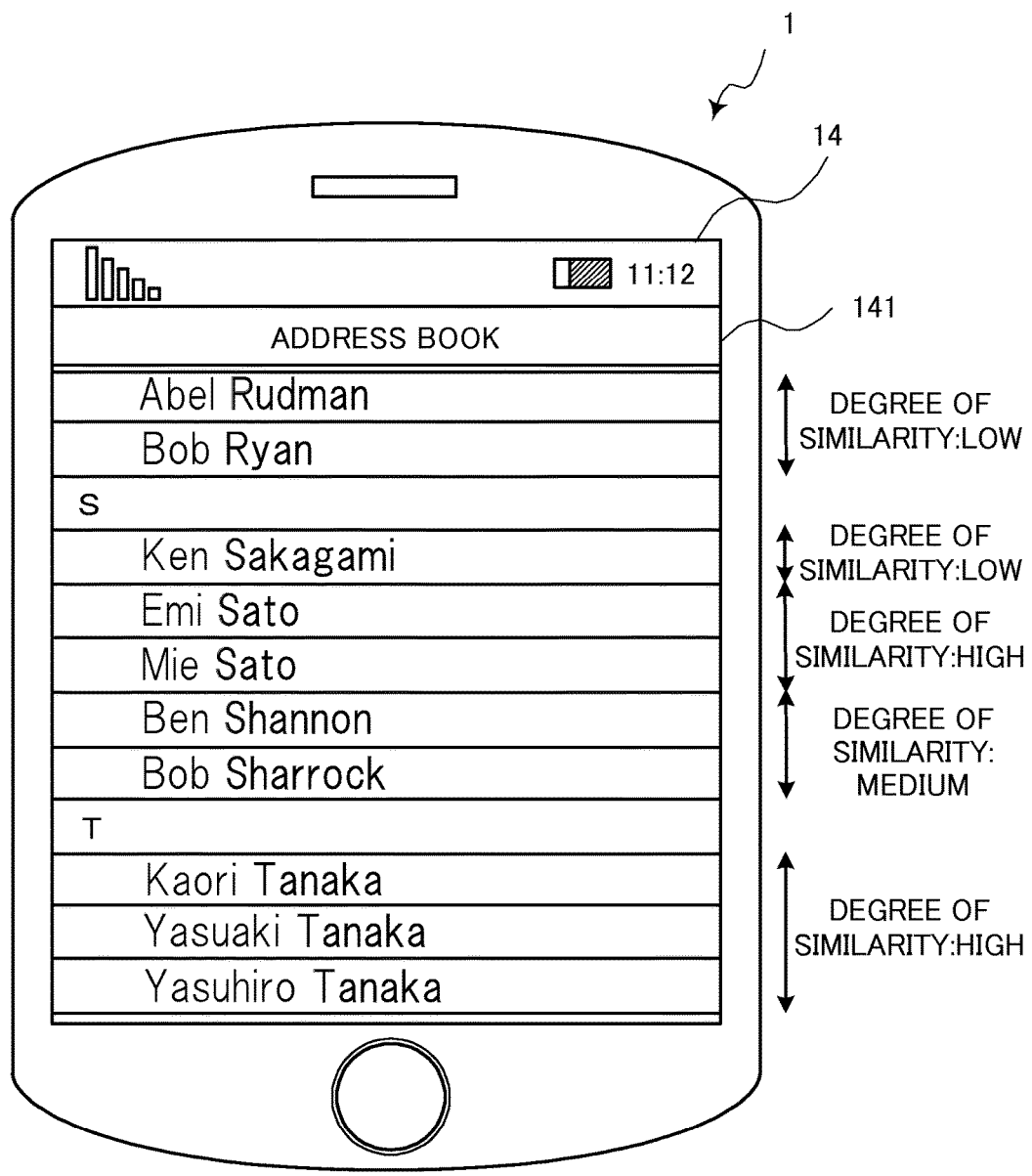
FIG. 16 is a view showing examples of the degrees of similarity of individual names displayed on a display section of the display apparatus according to Embodiment 7 of the present invention.

FIG. 16 is a view showing examples of the degrees of similarity of individual names displayed on the display section 14. As shown in FIG. 16, the names whose adjacent names contain the same character or a character highly similar in shape have a high degree of similarity calculated. For example, the name "Yasuaki Tanaka" has a high degree of similarity to the adjacent name "Yasuhiro Tanaka". On the other hand, the names whose adjacent names do not contain the same character or any character highly similar in shape have a low degree of similarity calculated (for example, "Bob Ryan"). Although in FIG. 16 the degree of similarity is shown in three levels, "High", "Middle", and "Low", the degree of similarity is actually calculated as a value.

Figure 17:
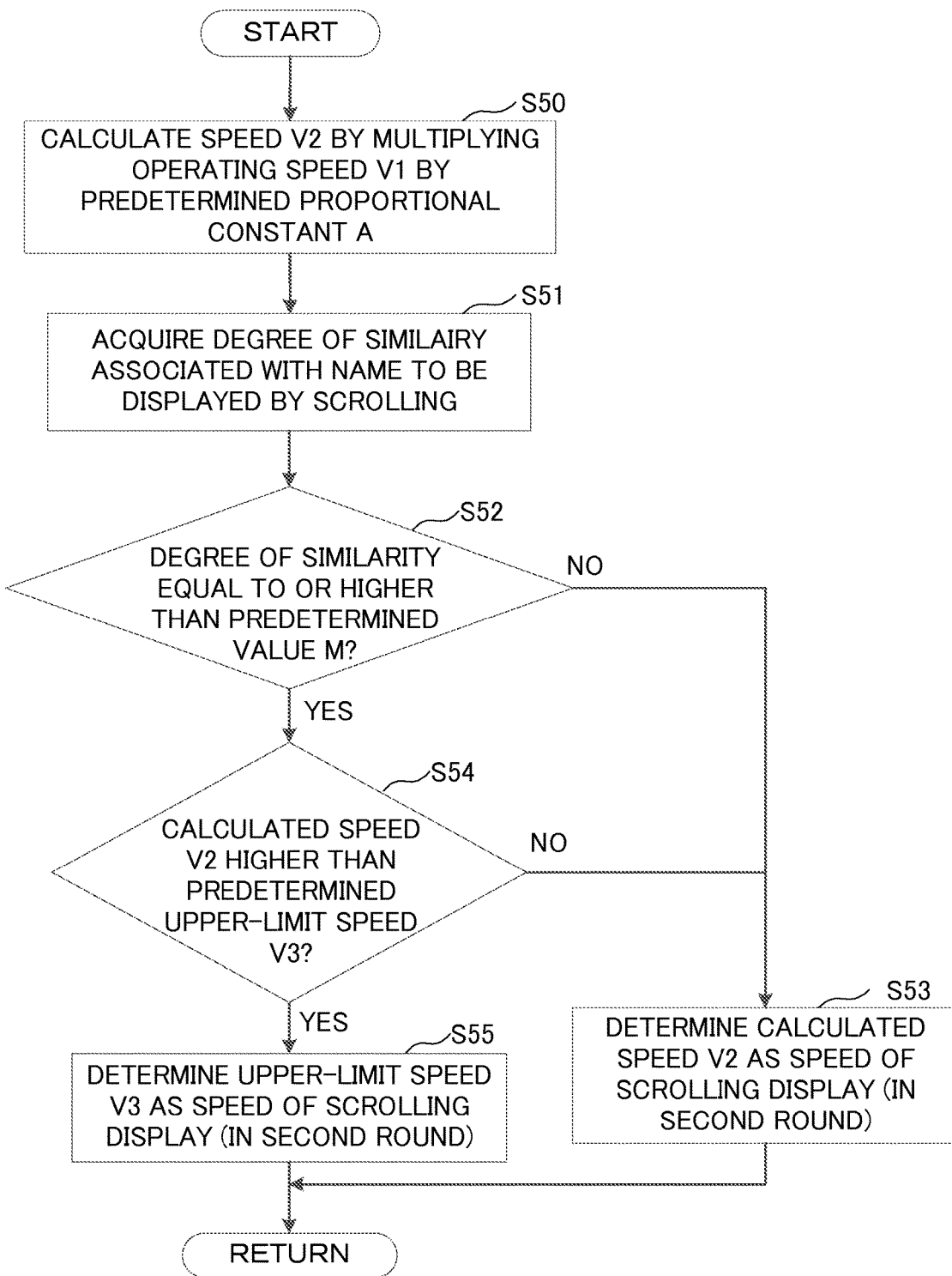
FIG. 17 is a flowchart showing a flow of processing for determining the speed of scrolling display (in the second round) in the display apparatus according to Embodiment 7 of the present invention.

Next, a description will be given of the operation of the display apparatus 1 having the above configuration. The following is a description of the case where an address book is displayed, on the display section 14, as an example of a list formed of a plurality of items enumerated in a predetermined order. FIG. 17 is a flowchart showing a flow of processing for determining the speed of scrolling display (in the second round) in step S15 shown in FIG. 4.

The display control section 101 first calculates the speed V2 by multiplying the operating speed V1 by the predetermined proportional constant A (step S50). Although for the first-round scrolling display the speed V2 has been determined as the speed of scrolling display, the speed of scrolling display for the second-round scrolling display is determined by additionally performing the following stages of processing from step S51 to step S55.

After the stage of processing in step S50, the display control section 101 acquires from the similarity degree storage section 17 the degree of similarity associated with each name to be displayed by scrolling (step S51). Then, the display control section 101 compares the acquired degree of similarity with a predetermined value M (step S52).

If the degree of similarity associated with the name to be displayed by scrolling is neither equal to nor higher than the predetermined value M (NO in step S52), the display control section 101 determines the calculated speed V2 as the speed of scrolling display in the second-round scrolling display (step S53).

On the other hand, if the degree of similarity associated with the name to be displayed by scrolling is equal to or higher than the predetermined value M (YES in step S52), the display control section 101 allows the name to be displayed by scrolling at a speed lower than the calculated speed V2, according to the stages of processing in steps S54 and S55.

In this manner, the display apparatus according to Embodiment 7 identifies, among a plurality of items enumerated in a list, an item or items having a degree of similarity of a predetermined value M or more as those likely to have been missed by a user in the previous scrolling display and allows the display section 14 to provide a scrolling display of each of the identified item or items at a speed lower than the speed specified by the scroll gesture accepted by the gesture acceptance section 102.

In step S54, the display control section 101 determines whether or not the calculated speed V2 is higher than a predetermined upper-limit speed V3. If the calculated speed V2 is higher than the predetermined upper-limit speed V3 (YES in step S54), the display control section 101 determines the predetermined upper-limit speed V3 as the speed of scrolling display in the second-round scrolling display (step S55).

On the other hand, if the calculated speed V2 is lower than the predetermined upper-limit speed V3 (NO in step S54), the display control section 101 determines the calculated speed V2 as the speed of scrolling display in the second-round scrolling display (step S53).

Figure 19A:
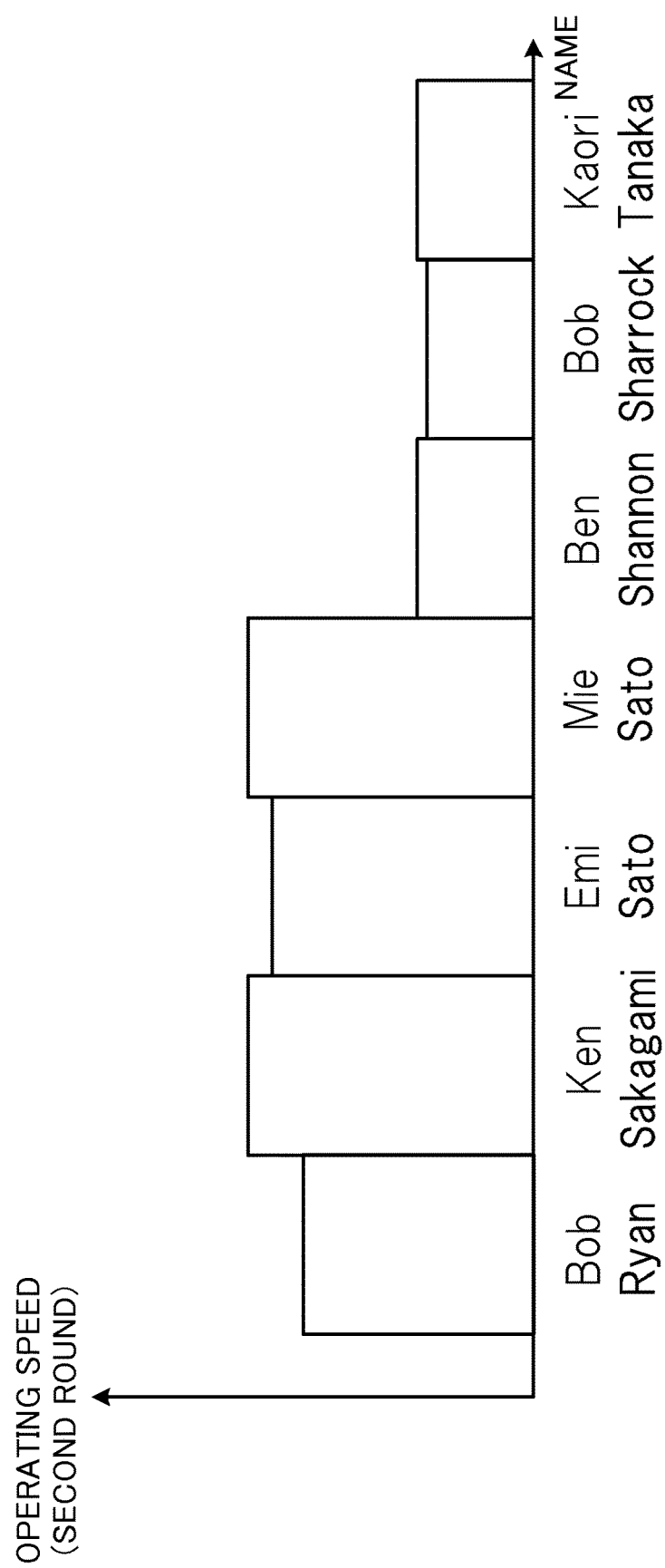

The above-described processing will be described in more detail with reference to FIGS. 18, 19A, and 19B. FIG. 7 is a graph showing the degrees of similarity stored in the similarity degree storage section 17 for the individual names enumerated in the address book. FIG. 19A is a graph showing the operating speeds of a scroll gesture for the scrolling display in the second round for the individual names enumerated in the address book and FIG. 19B is a graph showing the speeds of scrolling display determined based on the operating speeds shown in FIG. 19A.

In the example shown in FIG. 18, the degrees of similarity associated with the three names, "Emi Sato", "Mie Sato", and "Kaori Tanaka" are higher than the predetermined value M. In this case, for each of the names other than the three names, "Emi Sato", "Mie Sato", and "Kaori Tanaka", as shown in FIG. 19B, the speed V2 calculated by multiplying the operating speed shown in FIG. 19A by the predetermined proportional constant A is determined as the speed of scrolling display in the second round.

On the other hand, for each of the two names, "Emi Sato" and "Mie Sato", the speed V2 calculated by multiplying the operating speed shown in FIG. 19A by the predetermined proportional constant A is higher than the predetermined upper-limit speed V3 (see the dotted lines in the figure). Therefore, the speed of scrolling display is reduced to the upper-limit speed V3.

The three names, "Emi Sato", "Mie Sato", and "Kaori Tanaka", having high degrees of similarity to their adjacent names are highly likely to have been missed by the operator in the first-round scrolling display. For this reason, in the second-round scrolling display, the display control section 101 allows these three names to be displayed by scrolling at speeds lower than their speeds specified by the scroll gesture accepted by the gesture acceptance section 102.

Note that as for the name "Kaori Tanaka", the speed V2 calculated by multiplying the operating speed shown in FIG. 19A by the predetermined proportional constant A is lower than the predetermined upper-limit speed V3. Therefore, without adjusting the speed of scrolling display, the calculated speed V2 is determined as the speed of scrolling display.

In the display apparatus 1 according to this embodiment, the similarity degree calculating section 103 previously calculates the degrees of similarity of the individual names enumerated in the address book. Then, the display control section 101 allows the names having degrees of similarity equal to or higher than the predetermined value M to be displayed by scrolling at speeds lower than their speeds specified by the scroll gesture accepted by the gesture acceptance section 102.

The address book containing a name once missed by the operator is not simply displayed again by scrolling, but a name or names highly likely to have been missed because of high degrees of similarity to adjacent names are displayed by scrolling, each at a speed lower than the speed specified by the scroll gesture. Therefore, the name having been missed by the operator in the first-round scrolling display can be easily found. Hence, the display apparatus 1 according to this embodiment can make it easy for the operator to find a desired item without decreasing the operability.

Embodiment 8

Figure 20:
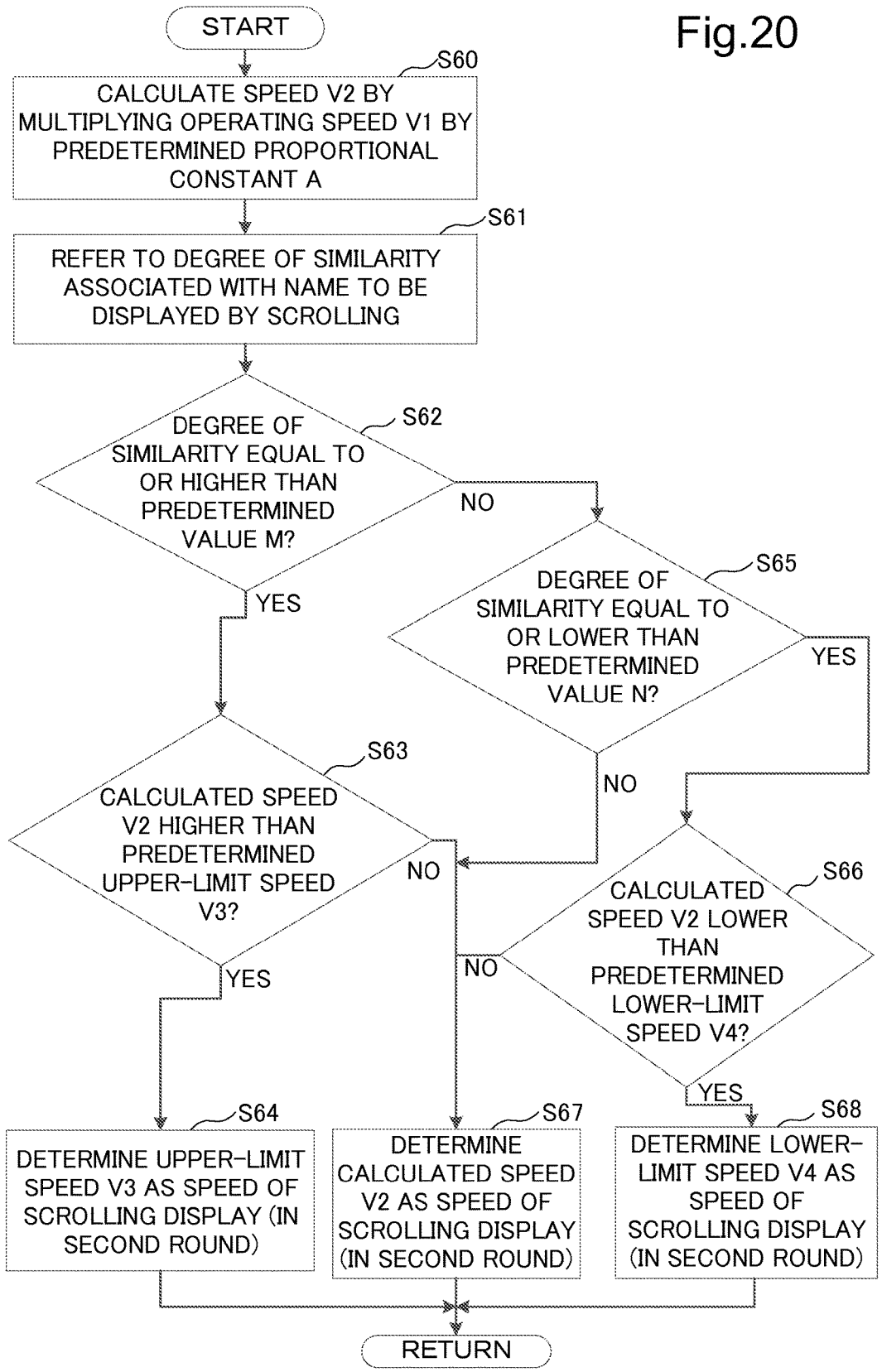
FIG. 20 is a flowchart showing a flow of processing for determining the speed of scrolling display (in the second round) on a display apparatus according to Embodiment 8 of the present invention.

FIG. 20 is a flowchart showing a flow of processing for determining the speed of scrolling display (in the second round) of a display apparatus according to Embodiment 8. Further description of the same stages of processing as those described with reference to the flowchart shown in FIG. 17 will be omitted.

In a stage of processing in step S62 following a stage of processing in step S61, the display control section 101 compares the acquired degree of similarity with a predetermined value M. If the degree of similarity associated with the name to be displayed by scrolling is neither equal to nor higher than the predetermined value M (NO in step S62), the display control section 101 compares the degree of similarity associated with the name to be displayed by scrolling with a predetermined value N (step S65).

If the degree of similarity associated with the name to be displayed by scrolling is neither equal to nor lower than the predetermined value N (NO in step S65), the display control section 101 determines the calculated speed V2 as the speed of scrolling display in the second-round scrolling display (step S67).

On the other hand, if the degree of similarity associated with the name to be displayed by scrolling is equal to or lower than the predetermined value N (YES in step S65), the display control section 101 determines whether or not the calculated speed V2 is lower than a predetermined lower-limit speed V4 (step S66). If the calculated speed V2 is lower than the predetermined lower-limit speed V4 (YES in step S66), the display control section 101 determines the predetermined lower-limit speed V4 as the speed of scrolling display in the second-round scrolling display (step S68). On the other hand, if the calculated speed V2 is higher than the predetermined lower-limit speed V4 (NO in step S66), the display control section 101 determines the calculated speed V2 as the speed of scrolling display in the second-round scrolling display (step S67).

Figure 21:
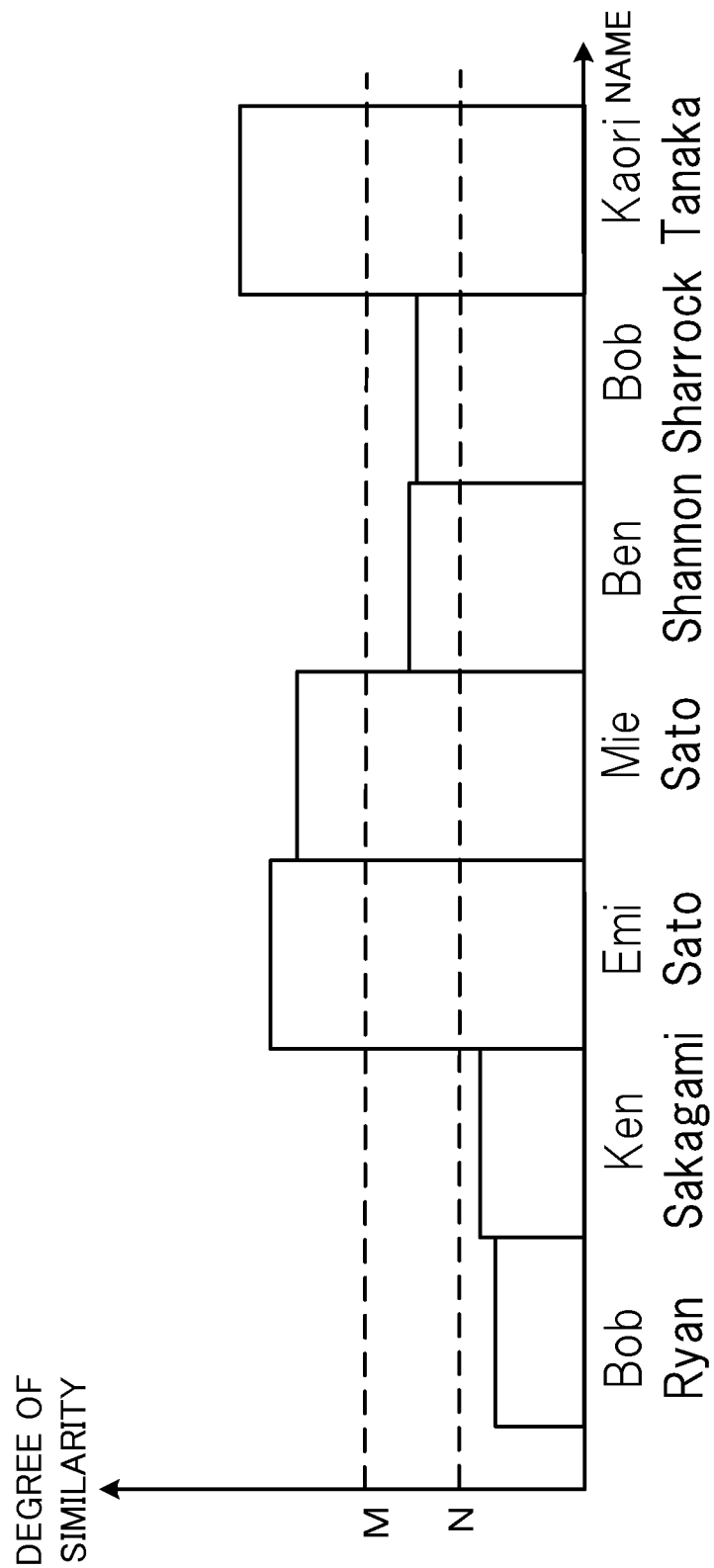
FIG. 21 is a graph showing examples of the degrees of similarity of names enumerated in an address book in Embodiment 8 of the present invention.
Figure 22B:
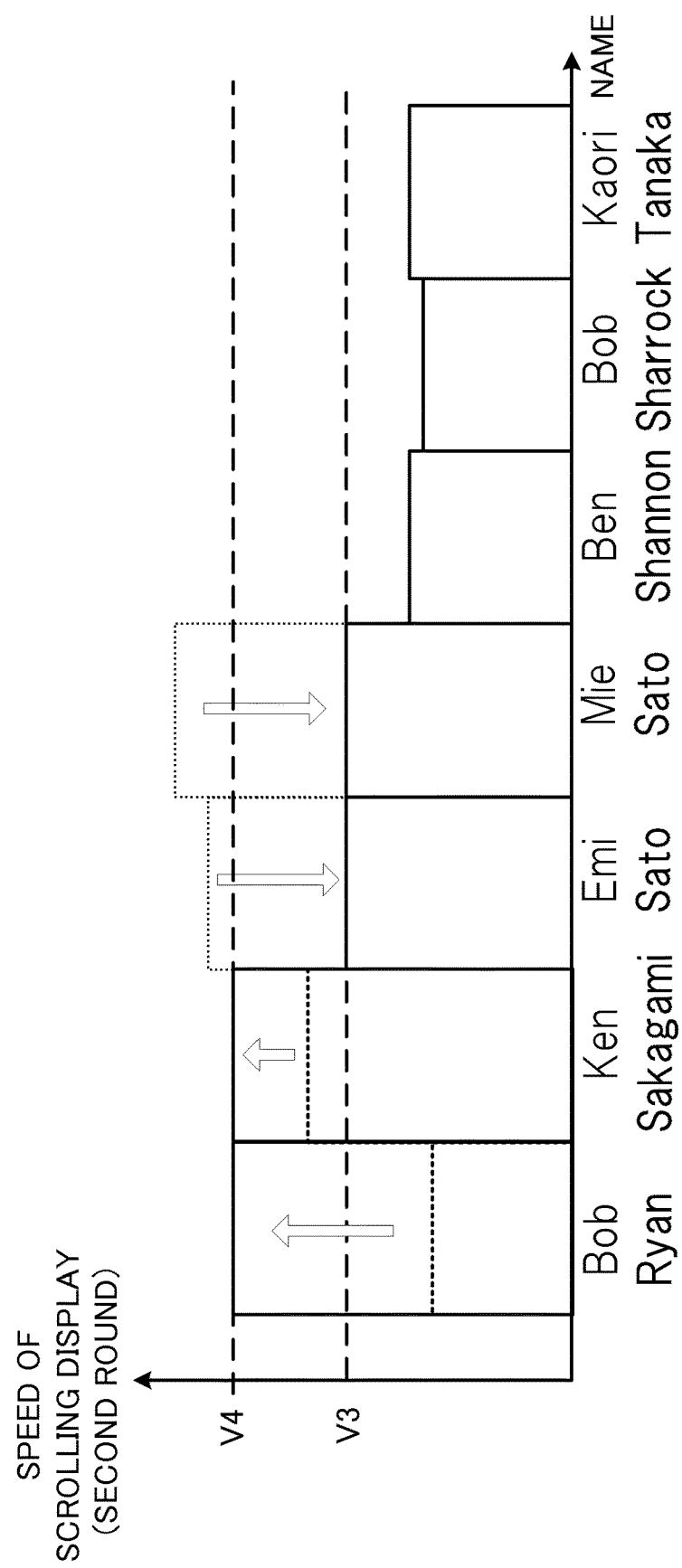

The above-described processing will be described in more detail with reference to FIGS. 21, 22A, and 22B. FIG. 21 is a graph showing the degrees of similarity stored in the similarity degree storage section 17 for the individual names enumerated in the address book. FIG. 22A is a graph showing the operating speeds of a scroll gesture for the scrolling display in the second round for the individual names enumerated in the address book and FIG. 22B is a graph showing the speeds of scrolling display determined based on the operating speeds shown in FIG. 22A.

In the example shown in FIG. 21, the degrees of similarity associated with the two names, "Bob Ryan" and "Ken Sakagami", are lower than the predetermined value N. In this case, for each of the two names, "Bob Ryan" and "Ken Sakagami", as shown in FIG. 22B, the speed V2 calculated by multiplying the operating speed shown in FIG. 22A by the predetermined proportional constant A is lower than the predetermined lower-limit speed V4 (see the dotted lines in the figure). Therefore, the speed of scrolling display is raised to the lower-limit speed V4.

The two names, "Bob Ryan" and "Ken Sakagami", having low degrees of similarity to their adjacent names are less likely to have been missed by the operator in the first-round scrolling display. For this reason, in the second-round scrolling display, the display control section 101 allows these three names to be displayed by scrolling at speeds higher than their speeds specified by the scroll gesture accepted by the gesture acceptance section 102. Since in this manner the names less likely to have been missed are displayed by scrolling at high speed, this can make it faster and easier for the operator to find a desired item.

Embodiment 9

Figure 23:
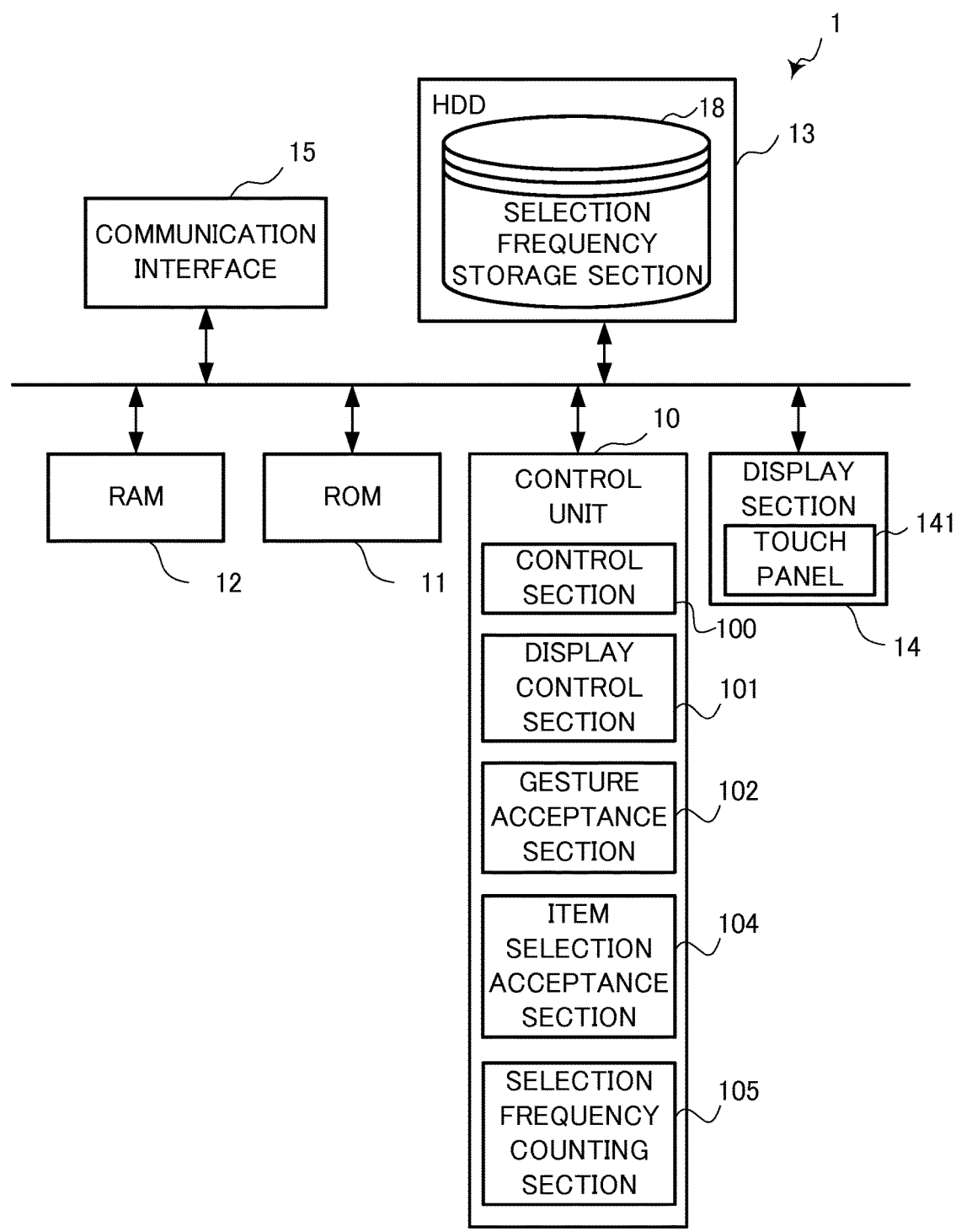
FIG. 23 is a block diagram showing an outline of the internal configuration of a display apparatus according to Embodiment 9 of the present invention.

FIG. 23 is a block diagram showing an outline of the internal configuration of a display apparatus according to Embodiment 9. Further description of the same stages of processing as those described with reference to the flowchart shown in FIG. 1 will be omitted.

The control unit 10 operates in accordance with the display control program stored on the HDD 13 or the like to additionally function as an item selection acceptance section 104 and a selection frequency counting section 105.

The display control section 101 normally determines a speed V2 (=A×V1) calculated by multiplying the operating speed V1 by a predetermined proportional constant A as the speed at which the address book is displayed by scrolling. Then, the display control section 101 allows the address book displayed on the display section 14 to be displayed by scrolling at the speed V2. As seen from the above, normally, the speed of scrolling display of the address book displayed on the display section 14 is proportional to the operating speed of the scroll gesture.

On the other hand, in non-normal cases, i.e., in providing a scrolling display of an item (name) whose frequency of selection counted by the selection frequency counting section 105 to be described hereinafter is equal to or greater than a predetermined value, the display control section 101 allows the item to be displayed by scrolling at a speed lower than the speed V2 (=A×V1) calculated by multiplying the operating speed V1 by the predetermined proportional constant A.

Figure 24:
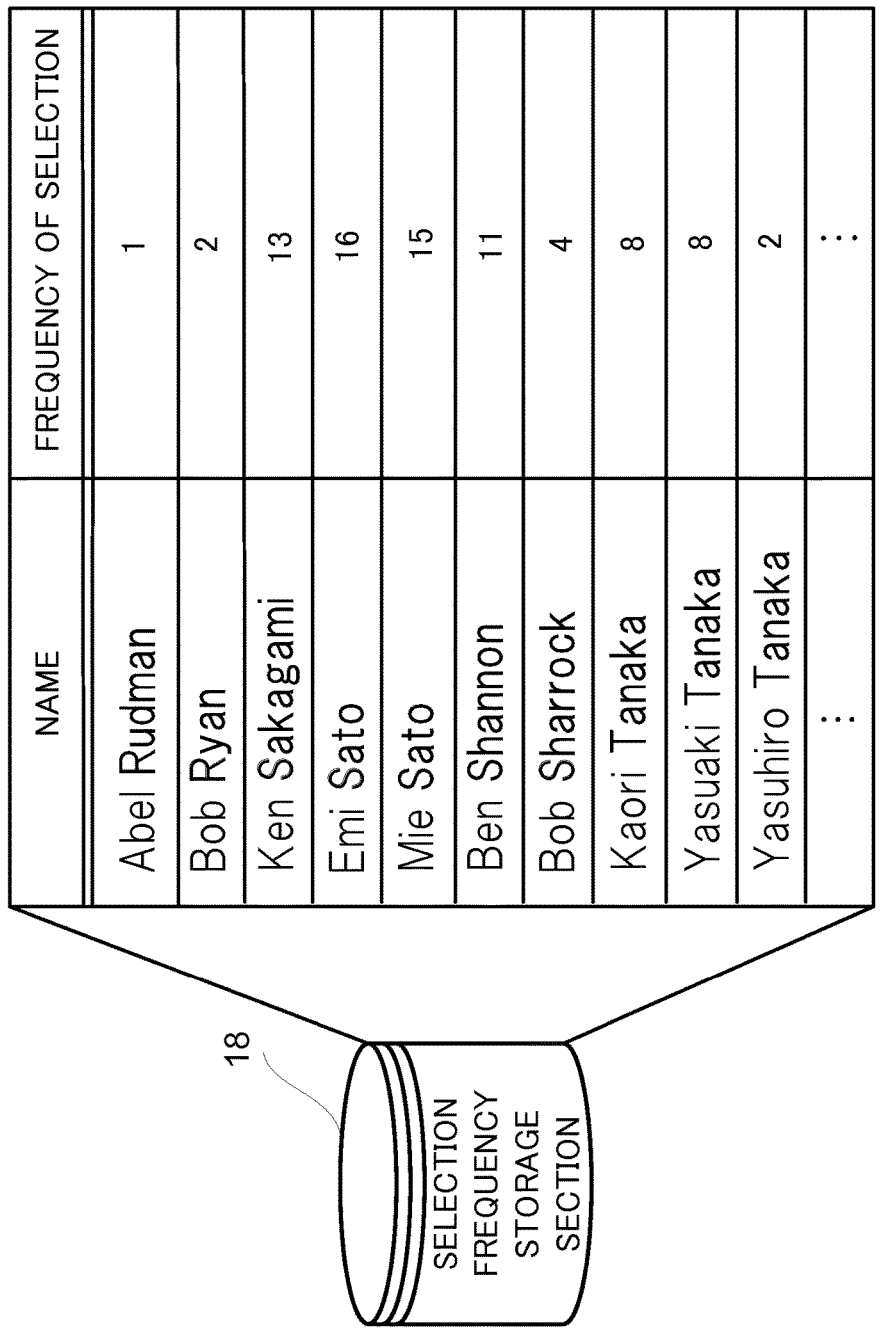
FIG. 24 is a diagram showing examples of the frequencies of selection stored in a selection frequency storage section of the display apparatus according to Embodiment 9 of the present invention.

The selection frequency counting section 105 is configured to count the frequency at which the operator's selection of the individual item (name) of the address book has been accepted by the item selection acceptance section 104. Furthermore, the selection frequency counting section 105 allows a selection frequency storage section 18 to store the counted frequency of selection. FIG. 24 is a diagram showing examples of the frequencies of selection stored in the selection frequency storage section 18. As shown in this figure, the selection frequency storage section 18 stores the frequencies of selection for the individual names enumerated in the address book.

Figure 25:
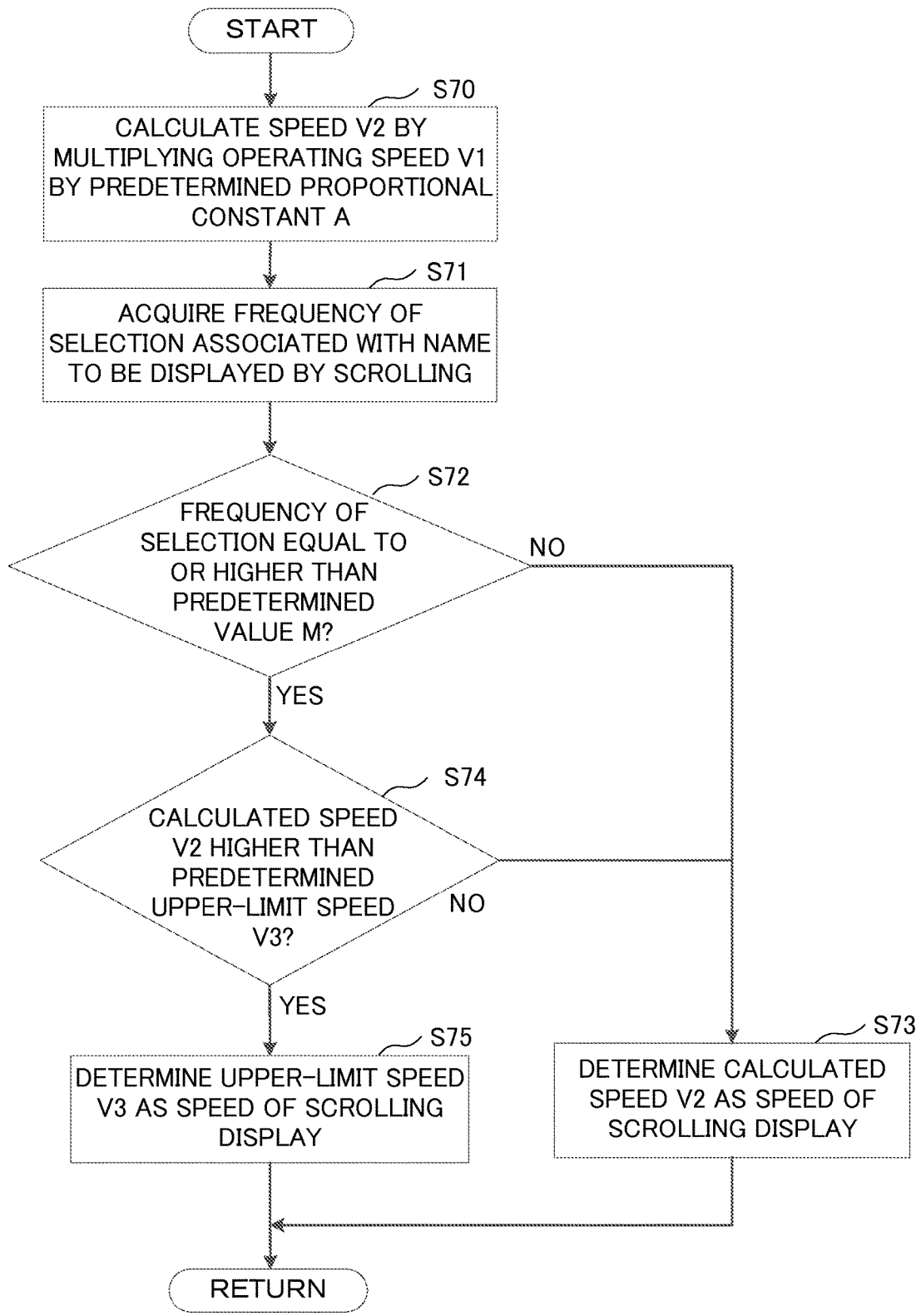
FIG. 25 is a flowchart showing a flow of processing for determining the speed of scrolling display (in the second round) on the display apparatus according to Embodiment 9 of the present invention.

Next, a description will be given of the operation of the display apparatus 1 having the above configuration. The following is a description of the case where an address book is displayed, on the display section 14, as an example of a list formed of a plurality of items enumerated in a predetermined order. FIG. 25 is a flowchart showing a flow of processing for determining the speed of scrolling display (in the second round) in step S15 shown in FIG. 4.

The display control section 101 first calculates the speed V2 by multiplying the operating speed V1 by the predetermined proportional constant A (step S70). Then, the display control section 101 acquires the frequency of selection associated with a name to be displayed by scrolling from the selection frequency storage section 18 (step S71).

After the stage of processing in step S71, the display control section 101 compares the frequency of selection acquired in the stage of processing in step S71 with a predetermined value M (step S72).

If the frequency of selection associated with the name to be displayed by scrolling is neither equal to nor higher than the predetermined value M (NO in step S72), the display control section 101 determines the calculated speed V2 as the speed of scrolling display (step S73).

On the other hand, if the frequency of selection associated with the name to be displayed by scrolling is equal to or higher than the predetermined value M (YES in step S72), the display control section 101 allows the name to be displayed by scrolling at a speed lower than the calculated speed V2, according to the stages of processing in steps S74 and S75.

In this manner, the display apparatus according to Embodiment 9 identifies, among a plurality of items enumerated in a list, an item or items whose frequency of selection counted by the selection frequency counting section 105 is a predetermined value or more as those likely to have been missed by a user in the previous scrolling display and allows the display section 14 to provide a scrolling display of each of the identified item or items at a speed lower than the speed specified by the scroll gesture accepted by the gesture acceptance section 102.

In step S74, the display control section 101 determines whether or not the calculated speed V2 is higher than a predetermined upper-limit speed V3. If the calculated speed V2 is higher than the predetermined upper-limit speed V3 (YES in step S74), the display control section 101 determines the predetermined upper-limit speed V3 as the speed of scrolling display (step S75).

On the other hand, if the calculated speed V2 is lower than the predetermined upper-limit speed V3 (NO in step S74), the display control section 101 determines the calculated speed V2 as the speed of scrolling display (step S73).

In this manner, in the display apparatus 1 according to this embodiment, the selection frequency counting section 105 counts the frequency of selection at which each name enumerated in the address book has been selected by the operator in the second-round scrolling display. Then, the display control section 101 allows the names having frequencies of selection equal to or higher than the predetermined value M to be displayed by scrolling at speeds lower than their speeds specified by the scroll gesture accepted by the gesture acceptance section 102.

The address book is not simply displayed by scrolling, but a name or names highly likely to have been missed by the operator in the first-round scrolling display because of high frequency of selection in the second-round scrolling display are displayed by scrolling, each at a speed lower than the speed specified by the scroll gesture. Therefore, the name which tends to be missed by the operator can be easily found. Hence, the display apparatus 1 according to this embodiment can make it easy for the operator to find a desired item without decreasing the operability.

Embodiment 10

Figure 26:
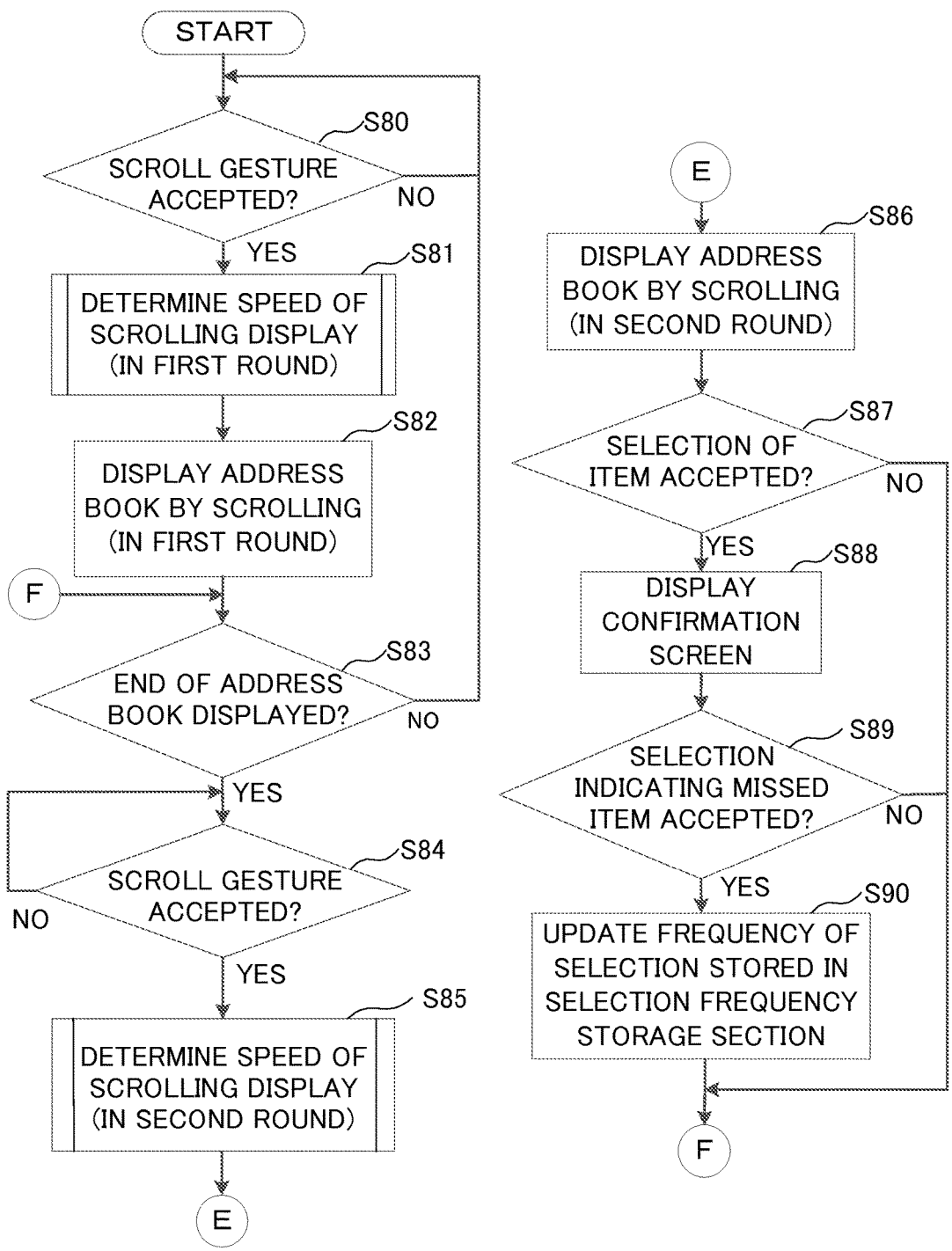
FIG. 26 is a flowchart showing a flow of a scrolling display operation of a display apparatus according to Embodiment 10 of the present invention.

FIG. 26 is a flowchart showing a flow of a scrolling display operation of a display apparatus according to Embodiment 10. Further description of the same stages of processing as those described with reference to the flowchart shown in FIG. 4 will be omitted.

Figure 27:
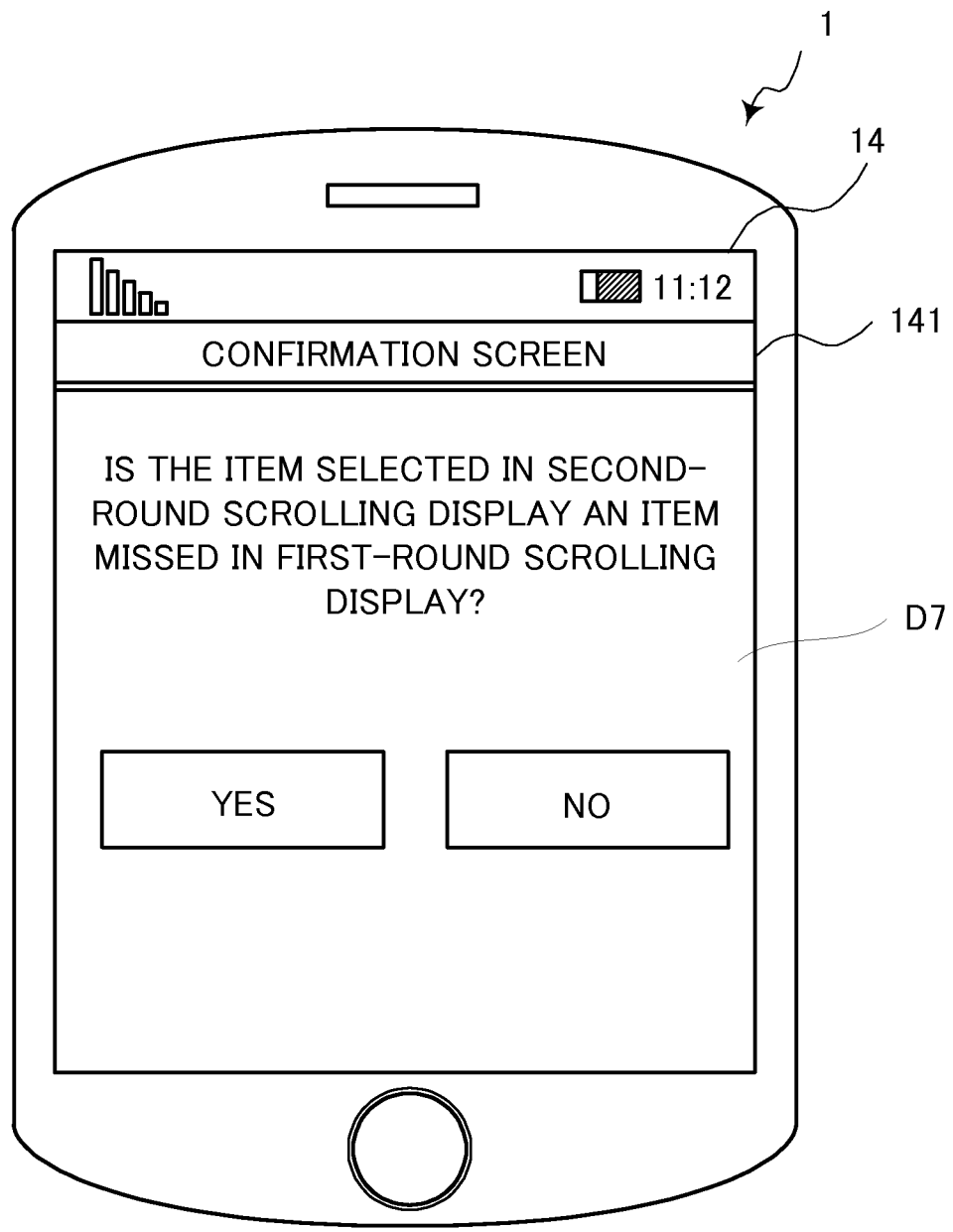
FIG. 27 is a view showing an example of a confirmation screen displayed on a display section of the display apparatus according to Embodiment 10 of the present invention.

When during a second-round scrolling display it is identified from a detection signal output from the touch panel 141 that the item selection acceptance section 104 has accepted a select gesture on an item (name) of the address book (YES in step S87), the selection frequency counting section 105 allows the display section 14 to display a confirmation screen D7 shown in FIG. 27 (step S88).

Then, the selection frequency counting section 105 determines, based on the confirmation screen D7, whether or not the selection has been accepted which indicates that the item selected by the operator in the second-round scrolling display is an item having been missed in the first-round scrolling display (step S89).

If the selection has been accepted which indicates that the relevant item is an item having been missed in the first-round scrolling display (YES in step S89), the selection frequency counting section 105 updates the frequency of selection stored in the selection frequency storage section 18 (step S90). On the other hand, if the selection has been accepted which indicates that the relevant item is not any item having been missed in the first-round scrolling display (NO in step S89), the selection frequency counting section 105 does not update the frequency of selection stored in the selection frequency storage section 18 but the process goes back to the stage of processing in step S83.

As described above, in the display apparatus according to Embodiment 10, the frequency of selection is updated only when the operator has made a selection indicating that the relevant item is an item having been missed in the first-round scrolling display. Therefore, the display apparatus according to Embodiment 10 can provide a scrolling display of items likely to be missed by an operator, with higher accuracy and at speeds lower than the speeds specified by the scroll gesture accepted by the gesture acceptance section 102.

<Supplements>

The present invention is not limited to the configurations of the above embodiments and can be modified in various ways. For example, although the above embodiments show the display apparatus 1 which is a mobile device, such as a smartphone, taken as an example of the display apparatus according to the present invention, the present invention is not necessarily limited to this case. The present invention can be applied to, in addition to mobile devices, such as smartphones, various types of equipment with a display section, such as personal computers and image forming apparatuses.

Furthermore, although in the above embodiments a description has been given of the case where an image displayed on the display section 14 is scrolled by a swipe gesture using a touch panel function, the present invention is not necessarily limited to this case. The image displayed on the display section 14 may be scrolled by a swipe gesture without using a touch panel function. Such gestures include, for example, a scroll gesture using the rotation of a wheel button provided in a mouse or the like and a scroll gesture using the selection of a scroll bar.

The display control program described in the above embodiments may be that stored on a computer-readable non-transitory recording medium, such as a hard disk, a CD-ROM, a DVD-ROM or a semiconductor memory.

Furthermore, the configurations described in the above embodiments may be partly combined.

The invention claimed is:

1. A display apparatus comprising:
a display section configured to display a list formed of a plurality of items enumerated in a predetermined order;
a gesture acceptance section configured to accept a scroll gesture on the list displayed on the display section; and
a display control section configured to allow the display section to provide a first-round scrolling display of the list when the list is displayed on the display section and a scroll gesture is received by the gesture acceptance section at a speed specified by the scroll gesture and, when allowing the display section to display a last item of the plurality of items enumerated in the list, allow the display section to provide a second-round scrolling display of the list from a beginning item of the plurality of items following the display of the last item,
wherein in providing the second-round scrolling display of the list, the display control section identifies, among the plurality of items enumerated in the list, an item likely to have been missed by a user in the first-round scrolling display and allows the display section to provide the scrolling display of the identified item at a speed different from the speed in the first-round scrolling display or in a display manner different from that of the other items,
the display apparatus further comprises a similarity degree calculating section configured to calculate a degree of similarity of each of the plurality of items enumerated in the list to the adjacent items in the list, and
the display control section is configured to identify, among the plurality of items, an item having a degree of similarity of a predetermined value or more as an item likely to have been missed by the user in the previous scrolling display.

2. The display apparatus according to claim 1, wherein the similarity degree calculating section is further configured to calculate the degree of similarity based on similarity in character shape and similarity in nominal designation to the adjacent items.

* * * * *